US012686530B2

(12) United States Patent
Rothhaar et al.

(10) Patent No.: US 12,686,530 B2
(45) Date of Patent: Jul. 21, 2026

(54) TEST METHOD FOR QUALITY EVALUATION AND COATED CONTAINER

(71) Applicants: Schott AG, Mainz (DE); SCHOTT Pharma Schweiz AG, St. Gallen (CH)

(72) Inventors: Uwe Rothhaar, Birkenheide (DE); Michaela Klause, Mainz (DE); Florence Buscke, Mainz (DE); Sebastian Brechler, Flawil (CH); Eveline Rudigier-Voigt, Mainz (DE); Jovana Djordjevic-Reiß, Mainz (DE); Hartmut Bauch, Mommenheim (DE); Sylvia Biedenbender, Bingen (DE)

(73) Assignees: SCHOT AG, Mainz (DE); SCHOTT Pharma Schweiz AG, St. Gallen (CH)

( * ) Notice: Subject to any disclaimer, the term of this patent is extended or adjusted under 35 U.S.C. 154(b) by 1106 days.

(21) Appl. No.: 17/704,654

(22) Filed: Mar. 25, 2022

(65) Prior Publication Data

US 2022/0306341 A1     Sep. 29, 2022

(30) Foreign Application Priority Data

Mar. 25, 2021     (EP) ..................................... 21164881

(51) Int. Cl.
*B65D 23/02*     (2006.01)
*A61J 1/14*     (2023.01)
(Continued)

(52) U.S. Cl.
CPC ............ *B65D 23/02* (2013.01); *A61J 1/1468* (2015.05); *C03C 3/06* (2013.01); *C03C 3/078* (2013.01);
(Continued)

(58) Field of Classification Search
CPC ...... B65D 23/02; A61J 1/1468; C03C 17/004; C03C 2217/70; C08J 7/04; G01N 33/0081
See application file for complete search history.

(56) References Cited

U.S. PATENT DOCUMENTS

| | | | |
|---|---|---|---|
| 4,983,255 A | 1/1991 | Gruenwald et al. | |
| 5,972,436 A | 10/1999 | Walther | |
| (Continued) | | | |

FOREIGN PATENT DOCUMENTS

| | | |
|---|---|---|
| CN | 106318197 A | 1/2017 |
| CN | 209979456 U | 1/2020 |
| (Continued) | | |

OTHER PUBLICATIONS

"Coating of glass substrates to prevent alkali ion diffusion into pharmaceutical solutions", Sebastian Schweiger et al. Surface & Coatings Technology, Elsevier, NL, vol. 258, Jun. 24, 2014, pp. 1249-1255 (7 pages).

(Continued)

*Primary Examiner* — Laura A Auer
(74) *Attorney, Agent, or Firm* — TAYLOR & EDELSTEIN, PC

(57) ABSTRACT

A coated container includes: a container having a surface; and a coating applied to at least part of the surface to form a coated surface. Leaching of at least one of one or more types of ions or one or more types of compounds is determined by performing an alkaline treatment on at least part of the coated surface to obtain an alkaline treated surface and performing an acidic treatment on at least part of the alkaline treated surface to obtain an acidic treated surface. The leaching of the at least one of one or more types of ions or one or more types of compounds from the coated surface is 5.00 mg/l or less.

19 Claims, 2 Drawing Sheets

(51) Int. Cl.

| | |
|---|---|
| *C03C 3/06* | (2006.01) |
| *C03C 3/078* | (2006.01) |
| *C03C 3/083* | (2006.01) |
| *C03C 3/085* | (2006.01) |
| *C03C 3/087* | (2006.01) |
| *C03C 3/089* | (2006.01) |
| *C03C 3/091* | (2006.01) |
| *C03C 17/00* | (2006.01) |
| *C08J 7/04* | (2020.01) |

(52) U.S. Cl.
CPC .............. *C03C 3/083* (2013.01); *C03C 3/085* (2013.01); *C03C 3/087* (2013.01); *C03C 3/089* (2013.01); *C03C 3/091* (2013.01); *C03C 17/004* (2013.01); *C08J 7/04* (2013.01); *C03C 2217/70* (2013.01); *C08J 2345/00* (2013.01)

(56) References Cited

U.S. PATENT DOCUMENTS

| | | | |
|---|---|---|---|
| 6,117,243 | A | 9/2000 | Walther |
| 6,383,642 | B1 | 5/2002 | Le Bellac et al. |
| 6,537,626 | B1 | 3/2003 | Spallek et al. |
| 6,599,594 | B1 | 7/2003 | Walther et al. |
| 2003/0059561 | A1 | 3/2003 | Ueda et al. |
| 2010/0075077 | A1 | 3/2010 | Bicker et al. |
| 2010/0298738 | A1 | 11/2010 | Felts et al. |
| 2011/0283785 | A1 | 11/2011 | Askin et al. |
| 2017/0175263 | A1* | 6/2017 | Yamamoto ........... C23C 16/045 |

FOREIGN PATENT DOCUMENTS

| | | |
|---|---|---|
| DE | 19629877 C1 | 3/1997 |
| EP | 0 811 367 A2 | 12/1997 |
| EP | 0 821 079 A1 | 1/1998 |
| EP | 2 106 461 B1 | 4/2012 |
| GB | 1 422 12 | 1/1976 |
| JP | 2014-37459 A | 2/2014 |
| WO | 03/015122 A1 | 2/2003 |
| WO | 2008/071458 A1 | 6/2008 |
| WO | 2017207940 A1 | 12/2017 |
| WO | 2018/157097 A1 | 8/2018 |

OTHER PUBLICATIONS

"Development of a Combined Leaching and Ion-Exchange System for Valorisation of Spent Potlining Waste", Thomas J. Robshaw et al., Waste and Biomass Valorization, Springer Netherlands, NL, vol. 11, No. 10, Feb. 10, 2020, pp. 5467-5481 (15 pages).

"Quality attributes and evaluation of pharmaceutical glass containers for parenterals", Charudharshini Srinivasan et al., International Journal of Pharmaceutics, Elsevier, NL, vol. 568, Jul. 11, 2019 (16 pages).

"Leaching of borosilicate glasses. I. Experiments", A. Ledieu et al. Journal of Non-Crystalline Solids, North-Holland Physics Publishing, Amsterdam, NL, vol. 343, No. 1-3, Sep. 1, 2004 pp. 3-12 (10 pages).

"The Certification of a Reference Material for the Determination of the Alkali Leaching From Pharmaceutical Glass Containers IRMM-435", U. Watjen et al., European Commission Joint Research Centre, Mar. 12, 2012 (48 pages).

Extended European Search Report dated Aug. 1, 2022 for European Patent Application No. 22164448.7 (11 pages).

Chinese Office Action dated Jun. 30, 2022 for Chinese Patent Application No. 202220671924.4 (1 page).

English Translation of Chinese Office Action dated Jun. 30, 2022 for Chinese Patent Application No. 202220671924.4 (1 page).

* cited by examiner

TEST METHOD FOR QUALITY EVALUATION AND COATED CONTAINER

CROSS REFERENCE TO RELATED APPLICATIONS

This application claims priority to European Patent Application No. EP 21164881.1 filed on Mar. 25, 2021, which is incorporated in its entirety herein by reference.

BACKGROUND OF THE INVENTION

1. Field of the Invention

The invention relates to a method for a quality evaluation of a coated container, especially the adhesion of the coating on the surface of the container; and a coated container having enhanced stability in a broad pH-range for a long time.

2. Description of the Related Art

For decades, pharmaceutical compositions have been packaged in containers, e.g. vials, ampoules, cartridges or syringes. The high requirements to the containers led to an ongoing development of new materials for the containers. However, there is a point where the costs for further development of the bulk material of the container, e.g. the glass composition, exceed the benefit and at a certain point, the material of the container cannot be further improved. To further improve the performance of the containers, coatings can be applied and a plurality of coatings are known, e.g. EP 0 821 079 and EP 0 811 367.

If the pharmaceutical composition comprises very sensitive drugs, e.g. biologics, it might be beneficial if they are stored in an alkaline buffer solution. To test whether the coated containers are resistant against leaching and/or delamination under alkaline conditions, very time-consuming storage studies must be performed and this prevents a fast evaluation whether a container is suitable for the storage of sensitive drugs in alkaline solutions or not. What is needed in the art is a way to quickly and/or reliably and/or cheaply and/or easily evaluate a coated container.

SUMMARY OF THE INVENTION

In some exemplary embodiments provided according to the present invention, a coated container includes: a container having a surface; and a coating applied to at least part of the surface to form a coated surface. Leaching of at least one of one or more types of ions or one or more types of compounds is determined by performing an alkaline treatment on at least part of the coated surface to obtain an alkaline treated surface and performing an acidic treatment on at least part of the alkaline treated surface to obtain an acidic treated surface. The leaching of the at least one of one or more types of ions or one or more types of compounds from the coated surface is 5.00 mg/l or less.

In some exemplary embodiments provided according to the present invention, a coated container includes a base material, an inner surface, and an outer surface. At least a part of the inner surface is a coated surface. The coated container exhibits in the following equation i/o≤d, a value d in [mg/cm$^2$]/[mg/cm$^2$] of 0.90, i is leaching of at least one of one or more types of ions or one or more types of compounds from the coated surface and o is leaching of at least one of one or more types of ions or one or more types of compounds of the base material.

In some exemplary embodiments, a method for a quality evaluation of a coated container is provided. The method includes: providing a coated container having a coated surface; performing an alkaline treatment on at least part of the coated surface of the coated container to obtain an alkaline treated surface; performing an acidic treatment on at least part of the alkaline treated surface to obtain an acidic treated surface and a treated acidic solution; and quantifying a leaching of at least one of one or more types of ions or one or more types of compounds of the at least part of the acidic treated surface to obtain results of the quality evaluation.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
FIG. 1 is a schematic side view of an at least partly coated surface.

The inventors have recognized the problem with known ways of evaluating containers and developed a test method for a quality evaluation of a coated container, especially the adhesion of the coating on the surface of the container and the chemical stability of the container surface, which is: fast; and/or reliable; and/or cheap; and/or easy to perform.

In addition, the inventors have recognized the benefits of this method and used the method to develop a coated container having improved properties, i.e. a coated container having: excellent resistance in a wide pH range; and/or improved resistance at high pH values; and/or high chemical stability; and/or excellent adhesion properties.

Exemplary embodiments disclosed herein provide a method for a quality evaluation of a coated container, which includes:

providing a coated container;

performing an alkaline treatment on at least part of the coated surface of the coated container to obtain an alkaline treated surface;

performing an acidic treatment on at least part of the alkaline treated surface to obtain an acidic treated surface and a treated acidic solution; and quantifying the leaching of one or more type(s) of ions and/or compounds of the at least part of the acidic treated surface to obtain results of the quality evaluation.

Furthermore, some exemplary embodiments disclosed herein provide a coated container, wherein the leaching of one or more type(s) of ions and/or compounds is obtainable by the method described herein, for example is obtainable by the method $L_i$ described herein, and wherein the leaching of one or more type(s) of ions and/or compounds is 5.00 mg/l or less.

Method

According to the invention, a method for a quality evaluation of a coated container comprises the following steps, which may be in this order:

providing a coated container;
    performing an alkaline treatment on at least part of the coated surface of the coated container to obtain an alkaline treated surface;
    performing an acidic treatment on at least part of the alkaline treated surface to obtain an acidic treated surface and a treated acidic solution; and
    quantifying the leaching of one or more type(s) of ions and/or compounds of the at least part of the acidic treated surface to obtain results of the quality evaluation.

In some embodiments, the method comprises the steps, which may be in this order:

providing a coated container;
    performing a heat treatment on at least part of the coated container to obtain a heat treated surface;
    performing an alkaline treatment on at least part of the heat treated surface to obtain an alkaline treated surface;
    performing an acidic treatment on at least part of the alkaline treated surface to obtain an acidic treated surface and a treated acidic solution; and
    quantifying the leaching of one or more type(s) of ions and/or compounds of the at least part of the acidic treated surface to obtain results of the quality evaluation.

Due to the heat treatment, the coating is further stressed and by the result of the quality evaluation, coatings can be identified which are more resistant to heat.

In some embodiments, the alkaline treatment comprises, and may consist of, the step(s):

bringing an alkaline solution exhibiting a pH of >7 to 14, for example 9 to 13, 9.5 to 12.5, or about 11.7, in contact with at least part of the surface of the coated container, for example of the heat treated surface; and
    optionally filling and rinsing, for example two times or more, such as three times, the at least part of the alkaline treated surface with ultrapure water.

Especially a pH of 9.0 or more, for example 9.5 or more, may be advantageous, since at this high pH values, the coating is further stressed and thus, the obtained results of the quality evaluation reflect a more detailed view on the properties of the coating with regard to resistance to high pH values.

In some embodiments, one or more of the following conditions are fulfilled:

i) the contact time of the alkaline solution and the at least part of the coated surface and/or heat treated surface is 1 second to 1 week, for example 1 minute to 1 day, 1 hour to 5 hours, or about 3 hours; and/or
    ii) the pressure outside the container is set to 0.1 bar to 10 bar, for example 0.5 bar to 4 bar; or ambient pressure+ about 1 bar; and/or
    iii) the temperature outside the container is set to 20° C. to 200° C., for example 50° C. to 200° C., 100° C. to 150° C., or about 121° C.; and/or
    iv) wherein the container is filled with the solution to a volume of 10% to 100%, for example 30% to 95%, or about 90% with respect to the brimful volume [vol./vol.] of the container; and/or
    v) the solution comprises, for example consists of, water, such as ultrapure water, and a base, for example one base, such as XOH, wherein X is selected from Na, K, and/or Li; and/or
    vi) the concentration of the base is 0.0001 mol/l to 1 mol/l, for example 0.001 mol/l to 0.1 mol/l, 0.003 mol/l to 0.020 mol/l, or about 0.005 mol/l; and/or
    vii) wherein the container is closed, for example by a closure seal, e.g. aluminum foil or a stopper, during the alkaline treatment.

If one or more of the above conditions i) to vii), such as all conditions i) to vii), are fulfilled, the coating is further stressed and thus, the obtained results of the quality evaluation reflect a more detailed view on the properties of the coating with regard to resistance to high pH values.

In some embodiments, one or more of the following conditions are fulfilled:

i) the contact time of the alkaline solution and the at least part of the coated surface and/or heat treated surface is 1 hour to 5 hours; and/or
    ii) the pressure outside the container is set to 0.5 bar to 4 bar; and/or
    iii) the temperature outside the container is set to 100° C. to 150° C.; and/or
    iv) the container is filled with the solution to a volume of about 90% with respect to the brimful volume [vol./vol.] of the container; and/or
    v) the solution consists of ultrapure water, and a base XOH, wherein X is selected from Na, K, or Li; and/or
    vi) the concentration of the base is 0.003 mol/l to 0.020 mol/l; and/or
    vii) the container is closed, for example by a closure seal, during the alkaline treatment.

In some embodiments, the contact time of the alkaline solution and the at least part of the coated surface and/or heat treated surface is 1 second to 1 week, for example 1 minute to 1 day, 1 hour to 5 hours, or about 3 hours. In some embodiments, the contact time of the alkaline solution and the at least part of the coated surface and/or heat treated surface is 1 second or more, 1 minute or more, 1 hour or more, or about 3 hours. In some embodiments, the contact time of the alkaline solution and the at least part of the coated surface and/or heat treated surface is 1 week or less, 1 day or less, or 5 hours or less.

In some embodiments, the pressure outside the container is set to 0.1 bar to 10 bar, 0.5 bar to 4 bar, or ambient pressure+about 1 bar. In some embodiments, the pressure outside the container is set to 0.1 bar or more, or 0.5 bar or more, or ambient pressure+about 1 bar. In some embodiments, the pressure outside the container is set to 10 bar or less, or 4 bar or less.

In some embodiments, the temperature outside the container is set to 20° C. to 200° C., 50° C. to 200° C., 100° C. to 150° C., or about 121° C. In some embodiments, the temperature outside the container is set to 20° C. or more, 50° C. or more, 100° C. or more, or about 121° C. In some embodiments, the temperature outside the container is set to 200° C. or less, or 150° C. or less.

In some embodiments, the container is filled with the solution to a volume of 10% to 100%, 30% to 95%, or about 90% with respect to the brimful volume [vol./vol.] of the container. In some embodiments, the container is filled with the solution to a volume of 10% or more, or 30% or more with respect to the brimful volume [vol./vol.] of the container. In some embodiments, the container is filled with the solution to a volume of 100% or less, or 95% or less, with respect to the brimful volume [vol./vol.] of the container.

In some embodiments, the solution comprises, for example consists of, water, such as ultrapure water, and a base, for example one base, such as XOH, wherein X is selected from Na, K, or Li. In some embodiments, the solution consists of ultrapure water and KOH as a base.

In some embodiments, the concentration of the base is 0.0001 mol/l to 1 mol/l, for example 0.001 mol/l to 0.10 mol/l, 0.003 mol/l to 0.020 mol/l, or about 0.005 mol/l. In some embodiments, the concentration of the base is 0.0001 mol/l or more, 0.001 mol/l or more, 0.003 mol/l or more, or 0.005 mol/l. In some embodiments, the concentration of the base is 1 mol/l or less, 0.10 mol/l or less, or 0.020 mol/l or less.

In one embodiment, the container is closed, for example by a closure seal, e.g. aluminum foil or a stopper, during the alkaline treatment.

In some embodiments, the heat treatment comprises, for example consists of: tempering the container, wherein one or more of the following conditions may be fulfilled:

i) the time of tempering is 1 min to 1 day, for example 30 min to 6 hours, or about 60 min; and/or ii) the temperature during the tempering outside the container is set to 25° C. to Tg of the base material of the container, for example 50° C. to 500° C., 100° C. to 400° C., 300° C. to 400° C.; or about 330° C.; and/or iii) the pressure during the tempering is set to 0.1 bar to 10 bar, such as ambient pressure.

If one or more of the above conditions i) to iii), such as all conditions i) to iii), are fulfilled, the coating is further stressed and thus, the obtained results of the quality evaluation reflect a more detailed view on the properties of the coating with regard to resistance to high temperatures.

In some embodiments, the heat treatment comprises, for example consists of, the step: tempering the container, wherein the following conditions are fulfilled:

i) the time of tempering is 30 min to 6 hours;

ii) the temperature during the tempering outside the container is set to 300° C. to 400° C.; and iii) the pressure during the tempering is set to 0.1 bar to 10 bar, for example ambient pressure.

In some embodiments, the acidic treatment comprises, for example consists of: bringing an acidic solution having a pH of <7, for example 0 to 6, 0 to 3, 0 to 2, or about 1, in contact with at least part of the alkaline treated surface to obtain an acidic treated surface and a treated acidic solution.

Especially a pH of 6 or less, such as 3 or less, may be advantageous, since at this low pH values, the coating is further stressed and thus, the obtained results of the quality evaluation reflect a more detailed view on the properties of the coating with regard to resistance to low pH values.

In some embodiments, the acidic treatment comprises, for example consists of: bringing an acidic solution in contact with at least part of the alkaline treated surface to obtain an acidic treated surface and a treated acidic solution: wherein one or more of the following conditions are fulfilled:

i) the contact time of the acidic solution and the at least part of the alkaline treated surface is 1 second to 1 week, for example 1 minute to 1 day, 1 hour to 10 hours, or about 6 hours; and/or ii) the pressure outside the container is set to 0.1 bar to 10 bar, for example 0.5 bar to 4 bar; or ambient pressure+ about 1 bar; and/or iii) the temperature outside the container is set to 20° C. to 200° C., for example 50° C. to 200° C., 100° C. to 150° C., or about 121° C.; and/or iv) wherein the container is filled with the solution to the filling volume according to ISO 4802-2:2016(E); section 7.2; and/or v) wherein the container is filled with the solution until a volume of 10% to 100%, for example 30% to 95%, or about 90% with respect to the brimful volume [vol./ vol.] of the container is reached; and/or vi) the solution comprises, for example consists of, water, such as ultrapure water; and an acid, for example one acid, such as HX, wherein X is selected from F, Cl, Br, and/or I; and/or vii) the concentration of the acid is 0.0001 mol/l to 1 mol/l, for example 0.01 mol/l to 0.5 mol/l, 0.05 mol/l to 0.2 mol/l, or about 0.1 mol/l; and/or viii) wherein the solution comprises an organic solvent, for example an alcohol, ester and/or ether, such as isopropanol; and/or;

ix) wherein the ratio [vol./vol.] of water to organic solvent is 0.1 to 10, for example 0.3 to 0.7, 0.4 to 0.6 or about 0.5; and/or κ) wherein the container is closed, for example by a closure seal, during the acidic treatment.

If one or more of the above conditions i) to x), for example above conditions i) to vii) and x) or all above conditions i) to x), are fulfilled, the coating is further stressed and thus, the obtained results of the quality evaluation reflect a more detailed view on the properties of the coating with regard to resistance to solutions having low pH values.

In some embodiments, the acidic treatment comprises the step: bringing an acidic solution in contact with at least part of the alkaline treated surface to obtain an acidic treated surface and a treated acidic solution, wherein the following conditions are fulfilled:

i) the contact time of the acidic solution and the at least part of the alkaline treated surface is 1 hour to 10 hours, for example about 6 hours;

ii) the pressure outside the container is set to ambient pressure+about 1 bar;

iii) the temperature outside the container is set to about 121° C.;

iv) the container is filled with the solution to the filling volume according to ISO 4802-2:2016(E); section 7.2;

v) the container is filled with the solution until a volume of 90% with respect to the brimful volume [vol./vol.] of the container is reached;

vi) the solution consists of ultrapure water and HCl as an acid;

vii) the concentration of the acid is 0.1 mol/l;

viii) the solution comprises an isopropanol;

ix) the ratio [vol./vol.] of water to organic solvent is 0.5;

x) the container is closed by a closure seal during the acidic treatment.

In some embodiments, the contact time of the acidic solution and the at least part of the alkaline treated surface is 1 second to 1 week, for example 1 minute to 1 day, 1 hour to 10 hours, or about 6 hours. In some embodiments, the contact time of the acidic solution and the at least part of the alkaline treated surface is 1 second or more, 1 minute or more, 1 hour or more, or about 6 hours. In some embodiments, the contact time of the acidic solution and the at least part of the alkaline treated surface is 1 week or less, 1 day or less, or 10 hours or less.

In some embodiments, the pressure and temperature outside the container is set to 0.5 bar to 4 bar and 100° C. to 150° C., ambient pressure+1 bar and 100° C. to 150° C., 0.5 bar to 4 bar and 121° C., or ambient pressure+1 bar and about 121° C.

In some embodiments, the solution consists of ultrapure water and HCl as an acid. In some embodiments, the solution consists of ultrapure water and 0.1 mol/l HCl. In some embodiments, the solution consists of ultrapure water and 0.1 mol/l of an acid HX, wherein X is selected from F, Cl, Br. In some embodiments, the solution consists of ultrapure water and 0.05 mol/l to 0.2 mol/l of an acid HX, wherein X is selected from F, Cl, Br. In some embodiments, the solution comprises water and 0.05 mol/l to 0.2 mol/l HCl.

In some embodiments, the container is filled with the solution until a volume of 90% with respect to the brimful volume [vol./vol.] of the container is reached.

In some embodiments, quantifying the leaching of one or more type(s) of ions and/or compounds of the at least part of the acidic treated surface to obtain results of the quality evaluation is quantifying the content of one or more type(s) of ions and/or compounds in the treated acidic solution to obtain results of the quality evaluation. Thus, the leaching of one or more type(s) of ions and/or compounds can be reliably determined and this is a fast and cheap method since no further extraction step is necessary.

In some embodiments, quantifying the leaching of one or more type(s) of ions and/or compounds of the at least part of the acidic treated surface to obtain results of the quality evaluation is quantifying the content of one or more type(s) of ions, for example alkali metal ions, such as [Na] ions, in the treated acidic solution to obtain results of the quality evaluation. The quantifying of Na ions may especially be provided if the container is a glass container and the base material of the container comprises Na, e.g. $Na_2O$. Thus, in some embodiments, the container is a glass container, and the base material of the container comprises Na, e.g. $Na_2O$.

In some embodiments, quantifying the leaching of one or more type(s) of ions and/or compounds of the at least part of the acidic treated surface to obtain results of the quality evaluation is quantifying the content of:

one or more compound(s) comprising C, for example one or more compound(s) comprising C except compounds comprising Si; and/or one or more monomer(s), for example norbornene, norbornane, and/or bicyclopentane; and/or one or more antioxidant(s), for example wherein the antioxidant(s) is/are selected from the group consisting of phenolic antioxidants, for example pentaerythritol tetrakis(3-(3,5-di-tert-butyl-4-hydroxyphenyl)propionate and/or dibutylhydroxytoluene (BHT); phosphite antioxidants, for example tris(2,4-ditert-butylphenyl) phosphite; phosphonite antioxidants, for example tetrakis(2,4-di-tert-butylphenyl)[1,1-biphenyl]-4,4'-diyl-bisphosphonite; and thioether antioxidants, for example wherein the antioxidant(s) is/are phenolic antioxidant(s), for example pentaerythritol tetrakis(3-(3,5-di-tert-butyl-4-hydroxyphenyl)propionate, in the treated acidic solution to obtain results of the quality evaluation.

The quantifying of one or more monomer(s) and/or, antioxidant(s), may be particularly provided if the container is a polymer container and the base material of the container comprises one or more monomer(s) and/or antioxidant(s). Thus, in some embodiments, the container is a polymer container and the base material of the container comprises one or more monomer(s) and/or antioxidant(s), for example one of the previously mentioned monomers and/or antioxidants.

In some embodiments, the quantifying is performed using chromatography; for example gas chromatography (GC), such as head space-gas chromatography (HS-GC), gas chromatography-mass spectrometry (GC-MS), and/or head space-gas chromatography-mass spectrometry (HS-GC-MS); and/or liquid chromatography (LC), such as liquid chromatography-mass spectrometry (LC-MS); and/or the quantifying is performed using inductively coupled plasma-atomic emission spectroscopy (ICP-AES), inductively coupled plasma-optical emission spectrometry (ICP-OES), inductively coupled plasma-mass spectrometry (ICP-MS), graphite furnace atomic absorption spectrometry (GFAAS), and/or flame atomic absorption spectrometry (FAAS); and/or the quantifying is performed using a titration process.

With these methods, the content of ions and/or compounds can be reliably determined.

In some embodiments, the method comprises the following step(s):

using the results of the quality evaluation obtainable by the method described herein to evaluate the suitability of a coated container for the storage of a solution, for example a pharmaceutical solution; and/or using the results of the quality evaluation obtainable by the method described herein to evaluate the stability of the coating of the coated container, for example the coated pharmaceutical container; and/or connecting and/or linking the results of the quality evaluation obtainable by the method described herein to a coated container, for example described herein, such as a coated pharmaceutical container, such as one described herein.

If the method comprises one or more of the above steps, the results of the quality evaluation are used to reduce complaints and thus costs. These steps can either be conducted at the plant, where the container(s) is/are produced and/or tested; and/or these steps can be performed in any other place, e.g. the plant where the coated container(s) is/are filled or the place where the coated container(s) is/are sold and/or advertised.

In some embodiments, the method comprises the following steps, which may be in this order:

producing a first and a second coated container with the same production method;

quantifying the leaching of the first coated container by the method described herein, for example method $L_i$, to obtain results of the quality evaluation of the first coated container; and applying and/or using the results of the quality evaluation of the first coated container to determine the suitability of the second coated container for the storage of a solution, for example in the second container, and/or using the results of the quality evaluation for the quality control of the first and/or second container; and/or applying and/or using the results of the quality evaluation of the first coated container to determine the suitability of the second coated container for the storage of a solution, for example in the second container, wherein the first coated container exhibits a leaching of one or more type(s) of ions and/or compounds, for example [Na] ions, of <90%; <50%, or <30% with respect to the limit of hydrolytic resistance for Type 1 glass containers; and/or applying and/or using the results of the quality evaluation of the first coated container to determine the suitability of the second coated container for the storage of a solution, for example in the second container, wherein the first coated container exhibits a leaching of one or more type(s) of ions and/or compounds, for example [Na] ions, of <90%; <50%, or <30% with respect to the limit of the maximum values in the hydrolytic resistance container surface test according to ISO 4802-2: 2016(E), section 9.2, Classes HCF1 and HCF2 ISO 4802-2:2016(E); and/or applying and/or using the results of the quality evaluation of the first coated container to determine the suitability of the second coated container for the storage of a solution, for example in the second container, wherein the first coated container exhibits a leaching of one or more type(s) of ions and/or compounds of 10.00 mg/l or less, for example 5.00 mg/l or less, 4.5 mg/l or less, 4.1 mg/l or less, 3.2 mg/l or less, 2.5 mg/l or less, 2.0 mg/l or less, 1.5 mg/l or less, 1.2 mg/l or less, 1.0 mg/l or less, 0.75 mg/l or less, 0.50 mg/l or less, 0.40 mg/l or less, 0.30 mg/l or less, 0.2 mg/l or less, or 0.1 mg/l or less.

If the method comprises one or more of the above steps, the results of the quality evaluation are used to reduce complaints and thus costs. These steps can either be conducted at the plant, where the container(s) is/are produced and/or tested; and/or these steps can be performed in any other place, e.g. the plant where the coated container(s) is/are filled or the place where the coated container(s) is/are sold and/or advertised.

In some embodiments, producing a first and a second coated container with the same production method comprises:

providing a first and a second container, wherein in some embodiments the first and the second container are glass containers, the first and the second container each comprising a surface;

performing a coating process on at least part, for example the inner surface, of the first and the second container, comprising the steps:

a) surrounding the at least part of the surface, such as the inner surface, of the first and the second container with a precursor P1; and b) irradiating the precursor P1 to generate a plasma; wherein a set of coating parameters is identical for coating the first and the second container, wherein the coating parameters are selected from the list of process temperature PT1, pulse duration PD1, frequency of irradiation of a microwave generator, input power IP1 of the microwave generator, a precursor P1, pulsed irradiation, pulse pause PP1 between two pulses, total time TT1 of irradiation, ratio [μs/ms] of all pulse durations PD1 [μs] to all pulse pauses PP1 [ms], process pressure PR1, process temperature decrease during the coating process, and flow rate of the precursor P1.

In some embodiments, the method comprises the following steps, for example in this order:

providing a first and a second coated container;

quantifying the leaching of the first coated container by a leaching method to obtain results of the quality evaluation of the first coated container;

applying the results of the quality evaluation of the first coated container to determine the suitability of the second coated container for the storage of a solution, or using the results of the quality evaluation for the quality control of the second container.

In some embodiments, the method comprises the following steps, for example in this order:

providing a first and a second coated container;

quantifying the leaching of the first coated container by a leaching method to obtain results of the quality evaluation of the first coated container;

applying the results of the quality evaluation of the first coated container to determine the suitability of the second coated container for the storage of a solution, or using the results of the quality evaluation for the quality control of the second container; wherein the leaching method comprises the steps:

providing a container, for example a coated container;

in case the container exhibits two openings, e.g. a syringe: covering the smaller opening with a closure, e.g. a tip cap;

filling 0.9× (brimful volume) of a 0.005 mol/l KOH-solution (KOH: Potassium hydroxide hydrate ≥99.995%, Suprapur® (Merck), demineralized water (ultrapure water of purity 1 analogue DIN ISO 3696 with ≤0.1 μS/cm at 25° C.)) in the pharmaceutical container;

closing the container with a closure seal, e.g. aluminum foil or a stopper;

inserting the container in an autoclave (e.g. Systec, model DX-150 (PM-CA-0001-01));

treating the container for 3 hours at 121° C. and 1 bar above ambient pressure, e.g. 2 bar;

opening the closure seal;

emptying the container;

filling and rinsing the container two times with deionized water;

in case the container is a glass container: filling 0.9× (brimful volume) of 0.1 mol/HCl-solution (hydrochloric acid 30% Suprapur® (Merck)) diluted with demineralized water (ultrapure water of purity 1 analogue DIN ISO 3696 with ≤0.1 μS/cm at 25° C.)), i.e. the same volume as used in the alkaline treatment, in the pharmaceutical container, or in case the container is a polymer container: filling 0.9× (brimful volume) of 0.1 mol/l HCl-solution (hydrochloric acid 30% Suprapur® (Merck)) diluted with demineralized water (ultrapure water of purity 1 analogue DIN ISO 3696 with ≤0.1 μS/cm at 25° C.) and isopropanol (1:1/vol %:vol %), i.e. the same volume as used in the alkaline treatment, in the pharmaceutical container;

closing the container with a closure seal;

inserting the container in an autoclave (e.g. Systec, model DX-150 (PM-CA-0001-01));

treating the container for 6 hours at 121° C. and 1 bar above ambient pressure;

opening the closure seal;

in case the container is a glass container: analyzing the content (mg/l) of one or more type(s) of ions and/or compounds, for example [Na] ions, in the 0.1 mol/l HCl-solution by FAAS analysis, e.g. using Varian SpectrAA 280 FS (PE 3-004), to obtain the value [mg/l] for the leaching of one or more type(s) of ions and/or compounds, for example [Na] ions;

in case the container is a polymer container: analyzing the content (mg/l) of one or more type(s) of ions and/or compounds, for example the antioxidant and/or organic compounds, in the 0.1 mol/l HCl-solution by LC-MS, e.g. using Waters I-Class UPLC system with Waters Xevo qTOF, to obtain the value [mg/l] for the leaching of one or more type(s) of ions and/or compounds, for example the antioxidant and/or organic compounds;

calculating the value (mg/cm$^2$) by the following formula: A*B/C, wherein A is the above value [mg/l] for the leaching of one or more type(s) of ions and/or compounds, wherein B is 0.9× brimful volume, and wherein C is the wetted inner surface of the container (in cm$^2$); to obtain the value [mg/cm$^2$] for the leaching of one or more type(s) of ions and/or compounds, for example Na ions or the antioxidant, i.e. the value i.

In some embodiments, the method comprises the following steps, for example in this order:

providing a first and a second coated container;

quantifying the leaching of the first coated container by a leaching method to obtain results of the quality evaluation of the first coated container;

applying the results of the quality evaluation of the first coated container to determine the suitability of the second coated container for the storage of a solution, or using the results of the quality evaluation for the quality control of the second container; wherein the leaching method comprises the steps:

providing a container, for example a coated container;

in case the container exhibits two openings, e.g. a syringe: covering the smaller opening with a closure, e.g. a tip cap;

filling 0.9× (brimful volume) of a 0.005 mol/l KOH-solution (KOH: Potassium hydroxide hydrate ≥99.995%, Suprapur® (Merck), demineralized water (ultrapure water of purity 1 analogue DIN ISO 3696 with ≤0.1 µS/cm at 25° C.)) in the pharmaceutical container;

closing the container with a closure seal, e.g. aluminum foil or a stopper;

inserting the container in an autoclave (e.g. Systec, model DX-150 (PM-CA-0001-01));

treating the container for 3 hours at 121° C. and 1 bar above ambient pressure, e.g. 2 bar;

opening the closure seal;

emptying the container;

filling and rinsing the container two times with deionized water;

filling 0.9× (brimful volume) of 0.1 mol/l HCl-solution (hydrochloric acid 30% Suprapur® (Merck)) diluted with demineralized water (ultrapure water of purity 1 analogue DIN ISO 3696 with ≤0.1 µS/cm at 25° C.)), i.e. the same volume as used in the alkaline treatment, in the pharmaceutical container;

closing the container with a closure seal;

inserting the container in an autoclave (e.g. Systec, model DX-150 (PM-CA-0001-01));

treating the container for 6 hours at 121° C. and 1 bar above ambient pressure;

opening the closure seal;

emptying the container;

filling and rinsing the container two times with deionized water;

drying the container, for example with air;

filling 0.9× (brimful volume) of n-hexane, i.e. the same volume as used in the alkaline treatment, in the pharmaceutical container;

shaking the pharmaceutical container in an orbital shaker (80 rpm) for 30 min at room temperature;

analyzing the content (mg/l) of one or more type(s) of ions and/or compounds, for example the antioxidant and/or organic compounds, in the n-hexane-solution by LC-MS, e.g. using Waters I-Class UPLC system with Waters Xevo qTOF, to obtain the value [mg/l] for the leaching of one or more type(s) of ions and/or compounds, for example the antioxidant and/or organic compounds;

calculating the value (mg/cm$^2$) by the following formula: A*B/C, wherein A is the above value [mg/l] for the leaching of one or more type(s) of ions and/or compounds, wherein B is 0.9× brimful volume, and wherein C is the wetted inner surface of the container (in cm$^2$) to obtain the value [mg/cm$^2$] for the leaching of one or more type(s) of ions and/or compounds, for example Na ions or the antioxidant, i.e. the value i.

In some embodiments, the method comprises the following steps, for example in this order:

providing a first and a second coated container;

quantifying the leaching of the first coated container by a leaching method to obtain results of the quality evaluation of the first coated container;

applying the results of the quality evaluation of the first coated container to determine the suitability of the second coated container for the storage of a solution, or using the results of the quality evaluation for the quality control of the second container; wherein the leaching method comprises the steps:

providing a container, for example the same container as used for the method $L_i$ above;

in case the container exhibits two openings, e.g. a syringe: covering the smaller opening with a closure, e.g. a tip cap;

filling 0.9× (brimful volume) of a solution in the pharmaceutical container;

closing the container with a closure seal;

inserting the container in a beaker, e.g. a stainless steel or aluminum beaker;

filling the beaker with a 0.005 mol/l KOH-solution (KOH: Potassium hydroxide hydrate ≥99.995%, Suprapur® (Merck), demineralized water (ultrapure water of purity 1 analogue DIN ISO 3696 with ≤0.1 µS/cm at 25° C.)) until a level is reached which is the same as the level in the container;

closing the beaker with a closure;

inserting the beaker in an autoclave (e.g. Systec, model DX-150 (PM-CA-0001-01));

treating the beaker for 3 hours at 121° C. and 1 bar above ambient pressure, e.g. 2 bar;

opening the closure of the beaker;

emptying the beaker;

filling and rinsing the beaker two times with deionized water and washing the outside of the container by rinsing the outer surface with deionized water;

inserting the container again in the beaker, e.g. the stainless steel or aluminum beaker;

in case the container is a glass container: filling the beaker with a 0.1 mol/l HCl-solution (hydrochloric acid 30% Suprapur® (Merck)) diluted with demineralized water (ultrapure water of purity 1 analogue DIN ISO 3696 with ≤0.1 µS/cm at 25° C.)))) until a level is reached which is the same as the level in the container, i.e. the same volume as used in the alkaline treatment, or in case the container is a polymer container: filling the beaker with a 0.1 mol/l HCl-solution (hydrochloric acid 30% Suprapur® (Merck)) diluted with demineralized water (ultrapure water of purity 1 analogue DIN ISO 3696 with ≤0.1 µS/cm at 25° C.) and isopropanol (1:1/vol %:vol %), until a level is reached which is the same as the level in the container, i.e. the same volume as used in the alkaline treatment;

closing the beaker with a closure;

inserting the beaker in an autoclave (e.g. Systec, model DX-150 (PM-CA-0001-01));

treating the beaker for 6 hours at 121° C. and 1 bar above ambient pressure;

opening the beaker;

in case the container is a glass container: analyzing the content (mg/l) of one or more type(s) of ions and/or compounds, for example [Na] ions, in the 0.1 mol/l HCl-solution by FAAS analysis, e.g. using Varian SpectrAA 280 FS (PE 3-004), to obtain the value [mg/l] for the leaching of one or more type(s) of ions and/or compounds, such as [Na] ions;

in case the container is a polymer container: analyzing the content (mg/l) of one or more type(s) of ions and/or compounds, for example the antioxidant and/or organic compounds, in the 0.1 mol/l HCl-solution by LC-MS, e.g. using Waters I-Class UPLC system with Waters Xevo qTOF, to obtain the value [mg/l] for the leaching of one or more type(s) of ions and/or compounds, for example the antioxidant and/or organic compounds;

calculating the value (mg/cm$^2$) by the following formula: A*B/C, wherein A is the above value [mg/l] for the leaching of one or more type(s) of ions and/or compounds, wherein B is the volume of the solution in the beaker, and wherein C is the wetted outer surface of the container (in cm$^2$); to obtain the value [mg/cm$^2$] for the leaching of one or more type(s) of ions and/or compounds, i.e. the value o.

In some embodiments, the method comprises the following step: filling the coated container, for example the second coated container, with a solution, for example a pharmaceutical composition, such as a pharmaceutical solution having a pH of 4 to 14, for example having a pH of >7 to 12 or having a pH of 9 to 11. In some embodiments, the pharmaceutical composition comprises one or more compound(s) explicitly mentioned in WO 2018/157097 A1, which is incorporated herein by reference.

An exemplary embodiment provided according to the present invention is the use of the results of the quality evaluation obtainable by the method described herein to evaluate the suitability of a coated container, for example a coated pharmaceutical container, for the storage of a solution, such as a pharmaceutical solution and/or the quality control of the production of a coated container. The use of the results of the quality evaluation reduces complaints and thus costs. The results of the quality evaluation can either be used at the plant, where the container(s) is/are produced and/or tested; and/or in any other place, e.g. the plant where the coated container(s) is/are filled or the place where the coated container(s) is/are sold and/or advertised.

Coated Container

An exemplary embodiment provided according the present invention is a coated container, wherein the leaching of one or more type(s) of ions and/or compounds is obtainable by the method described herein, for example is obtainable by the method L$_i$ described herein, and wherein the leaching of one or more type(s) of ions and/or compounds is 5.00 mg/l or less.

In some embodiments, the leaching of one or more type(s) of ions and/or compounds obtainable by the method described herein, such as by the method L$_i$ described herein, is 10.00 mg/l or less, for example 5.00 mg/l or less, 4.5 mg/l or less, 4.1 mg/l or less, 3.2 mg/l or less, 2.5 mg/l or less, 2.0 mg/l or less, 1.5 mg/l or less, 1.2 mg/l or less, 1.0 mg/l or less, 0.75 mg/l or less, 0.50 mg/l or less, 0.40 mg/l or less, 0.30 mg/l or less, 0.2 mg/l or less, or 0.1 mg/l or less. Thus, the resistance in a wide pH range, especially at high pH values can be further improved.

In some embodiments, the leaching of one or more type(s) of ions and/or compounds obtainable by the method described herein, for example obtainable by the method L$_i$ described herein, is 100% or less; for example 90% or less; 50% or less, 50% or less, or 1% or more and 30% or less; with respect the limit of the maximum values in the hydrolytic resistance container surface test according to ISO 4802-2:2016(E), section 9.2, Classes HCF1 and HCF2 ISO 4802-2:2016(E). Thus, the resistance in a wide pH range, especially at high pH values can be further improved.

In some embodiments, the leaching of one or more type(s) of ions and/or compounds, obtainable by the method described herein, for example obtainable by the method L$_i$ described herein, is a;

wherein a≤b*c;

wherein, if 0.9× (brimful volume) of the container is ≤1 ml, b is 5.00 mg/l, wherein, if 0.9× (brimful volume) of the container is >1 ml and ≤2 ml, b is 4.50 mg/l, wherein, if 0.9× (brimful volume) of the container is >2 ml and ≤3 ml, b is 4.10 mg/l, wherein, if 0.9× (brimful volume) of the container is >3 ml and ≤5 ml, b is 3.20 mg/l, wherein, if 0.9× (brimful volume) of the container is >5 ml and ≤10 ml, b is 2.50 mg/l, wherein, if 0.9× (brimful volume) of the container is >10 ml and ≤20 ml, b is 2.00 mg/l, wherein, if 0.9× (brimful volume) of the container is >20 ml and ≤50 ml, b is 1.50 mg/l, wherein, if 0.9× (brimful volume) of the container is >50 ml and ≤100 ml, b is 1.20 mg/l, wherein, if 0.9× (brimful volume) of the container is >100 ml and ≤200 ml, b is 1.00 mg/l, wherein, if 0.9× (brimful volume) of the container is >200 ml and ≤500 ml, b is 0.75 mg/l; and wherein, if 0.9× (brimful volume) of the container is >500 ml, b is 0.50 mg/l; and wherein c is 1.00, 0.90, 0.80, 0.70, 0.60, 0.50, 0.40, 0.30, 0.20, 0.15, 0.10, 0.08, or 0.05. Since the leaching is dependent on the size of the container (see ISO 4802-2:2016(E)), the above parameter may be preferred, especially for very small and large containers. If the parameter is fulfilled, the resistance in a wide pH range, especially at high pH values is further improved. In some embodiments, a is 0 mg/l or more, for example 0.001 mg/l or more, 0.01 mg/l or more, 0.1 mg/l or more, or 0.2 mg/l or more.

In some embodiments, the coated container comprises an inner surface and an outer surface, wherein at least a part of the inner surface is coated by a coating; and wherein the coated container exhibits in the following equation: i/o≤d a value d ([mg/cm$^2$]/[mg/cm$^2$]) of 0.90, wherein i is the leaching (mg/cm$^2$) of one or more type(s) of ions and/or compounds obtainable by the method described herein, for example by the method L$_i$ as described herein; and wherein o is the leaching (mg/cm$^2$) of one or more type(s) of ions and/or compounds of the base material of the coated container and/or is obtainable by the method L$_o$ as described herein. If this parameter is fulfilled, the protection of a pharmaceutical composition stored in the inside of the container is improved, especially improved compared to the same but uncoated container. Since most of the known coatings for containers are not at all resistant to the alkaline and the acidic treatment, which are part of the method described herein and also part of the method $L_i$ described herein, if the above parameter is fulfilled, the coating of the coated container exhibits excellent resistance to solution having a high or low pH value.

In some embodiments, the coated container comprises an inner surface and an outer surface, wherein at least a part of the inner surface is coated with a coating; and wherein the coated container exhibits in the following equation: i/o≤d a value d ([mg/cm$^2$]/[mg/cm$^2$]) of 0.90, wherein i is the leaching (mg/cm$^2$) of one or more type(s) of ions and/or compounds obtainable by the method $L_i$; and wherein o is the leaching (mg/cm$^2$) of one or more type(s) of ions and/or compounds of the base material of the coated container and is obtainable by the method $L_o$.

In some embodiments, the coated container comprises an inner surface and an outer surface, wherein at least a part of the inner surface is coated with a coating; and wherein the coated container exhibits in the following equation: i/o≤d a value d ([mg/cm$^2$]/[mg/cm$^2$]) of 0.90, wherein i is the leaching (mg/cm$^2$) of one or more type(s) of ions and/or compounds obtainable by the method $L_i$; and wherein o is the leaching (mg/cm$^2$) of one or more type(s) of ions and/or compounds of the base material of the coated container and is obtainable by the method $L_o$, wherein the one or more type(s) of ions and/or compounds obtainable by the method $L_i$ are the same species of ions and/or compounds as the one or more type(s) of ions and/or compounds of the base material of the coated container and is obtainable by the method $L_o$.

In some embodiments, d is 0.80, for example 0.70, 0.60, 0.50, 0.40, 0.30, 0.20, 0.14, 0.10, or 0.07. Thus, the protection of a pharmaceutical composition stored in the inside of the container is further improved.

In some embodiments, the coated container exhibits in the following equation: i/o≥e, a value e ([mg/cm$^2$]/[mg/cm$^2$]) of 0.00, for example 0.01, 0.02, 0.05, 0.10, 0.12, or 0.14.

In some embodiments, i is $1.0*10^{-10}$ mg/cm$^2$ to $1.0*10^{-3}$ mg/cm$^2$, for example $1.0*10^{-8}$ mg/cm$^2$ to $6.5*10^{-4}$ mg/cm$^2$, $1.0*10^{-7}$ mg/cm$^2$ to $6.0*10^{-4}$ mg/cm$^2$, $1.0*10^{-6}$ mg/cm$^2$ to $3.0*10^{-4}$ mg/cm$^2$, or $7.0*10^{-6}$ mg/cm$^2$ to $3.0*10^{-5}$ mg/cm$^2$. Thus, the protection of a pharmaceutical composition stored in the inside of the container is further improved.

In some embodiments, o is $1.1*10^{-5}$ mg/cm$^2$ to $1.0*10^{-1}$ mg/cm$^2$, for example $1.0*10^{-4}$ mg/cm$^2$ to $1.0*10^{-2}$ mg/cm$^2$, $6.5*10^{-4}$ mg/cm$^2$ to $1.0*10^{-3}$ mg/cm$^2$, or $6.8*10^{-4}$ mg/cm$^2$ to $7.5*10^{-4}$ mg/cm$^2$. As lower the value o, as better is the resistance of the base material of the container itself. Thus, as lower the value o, as better is the protection of a pharmaceutical composition stored in the inside of the container.

In some embodiments, i is the leaching (mg/cm$^2$) of one or more type(s) of ions and/or compounds obtainable by the method $L_i$ as described herein; and/or o is the leaching (mg/cm$^2$) of one or more type(s) of ions and/or compounds obtainable by the method $L_o$ as described herein. Thus, the values i and o can be reliably determined and only one container is needed to determine both parameters. The method $L_o$ can also be used, if the outer surface is coated, e.g. by a silicone coating or another coating obtainable by a PICVD coating. In some embodiments, the outer surface is not coated, if the method $L_o$ is used.

In some embodiments, o is the leaching (mg/cm$^2$) of one or more type(s) of ions and/or compounds leached out of an uncoated container, wherein the uncoated container is obtainable by the same production method as the coated container (however no coating is applied), wherein o is obtainable by the method described herein and/or obtainable by a method $L_i$ described herein. Thus, the values o and i can be reliably determined by only one method.

In some embodiments, the one or more type(s) of ions and/or compounds are alkaline metal ions and/or alkaline earth metal ions, for example Na ions and/or K ions. The quantifying of Na ions may be preferred if the container is a glass container and the base material of the container comprises Na, e.g. Na$_2$O. Thus, in some embodiments, the container is a glass container, and the base material of the container comprises Na, e.g. Na$_2$O.

In some embodiments, the one or more type(s) of ions and/or compounds are:

one or more compound(s) comprising C, for example one or more compound(s) comprising C except compounds comprising Si; and/or one or more monomer(s), for example norbornene, norbornane, and/or bicyclopentane; and/or one or more antioxidant(s), for example wherein the antioxidant(s) is/are selected from the group consisting of phenolic antioxidants, pentaerythritol tetrakis(3-(3, 5-di-tert-butyl-4-hydroxyphenyl)propionate and/or dibutylhydroxytoluene (BHT); phosphite antioxidants, tris(2,4-ditert-butylphenyl)phosphite; phosphonite antioxidants, for example tetrakis(2,4-di-tert-butylphenyl)[1,1-biphenyl]-4,4'-diylbisphosphonite; and thioether antioxidants, wherein the antioxidant(s) is/are phenolic antioxidant(s), pentaerythritol tetrakis(3-(3,5-di-tert-butyl-4-hydroxyphenyl)propionate.

In some embodiments, the container is a polymer container and the base material of the container comprises one or more antioxidant(s) and/or monomer(s).

The coating process to obtain the coated container is not particularly limited. In some embodiments, the coating is a coating obtainable by a coating process, for example a CVD process, a plasma-enhanced chemical vapor deposition (PECVD) process, plasma impulse chemical vapor deposition (PICVD) process or plasma assisted chemical vapor deposition (PACVD) process. This method is particularly suitable for applying a coating having excellent resistance in a wide pH range, improved resistance at high pH values, high chemical stability, and excellent adhesion properties.

In some embodiments, the coating is a coating obtainable by a pretreatment and a coating process, for example a CVD process, a plasma-enhanced chemical vapor deposition (PECVD) process, plasma impulse chemical vapor deposition (PICVD) process or plasma assisted chemical vapor deposition (PACVD) process, wherein the pretreatment is performed before the coating process. This method is particularly suitable for applying a coating and further improves the resistance in a wide pH range and at high pH values and further improves the chemical stability and adhesion properties.

In some embodiments, the coating process comprises the following steps:

providing a container, for example a glass container, comprising a surface;

performing a coating process on at least part, for example the inner surface, of the container, comprising:

a) surrounding the at least part of the surface, for example the inner surface, of the container with a precursor P1; and b) irradiating the precursor P1 to generate a plasma; wherein at least one, for example all, of the following parameters is/are fulfilled:

i) wherein the process temperature PT1 is 200° C. to Tg of the glass of the glass element, for example 200° C. to 500° C., 220° C. to 450° C., 240° C. to 320° C., or 250° C. to 300° C.; and/or ii) wherein the pulse duration PD1 of the plasma is 50 µs or less, for example 40 µs or less, for example 30 µs or less, 20 µs or less, 15 µs or less, 12 µs or less, 8 µs or less, 6 µs or less, 4 µs or less, or about 3 µs; and/or iii) wherein the pulse duration PD1 of the plasma is 0.1 µs or more, for example 0.5 µs or more, 1 µs or more, or 6 µs or more; and/or iv) wherein the irradiation is carried out by a microwave generator, for example wherein the ray has a frequency of 300 MHz to 300 GHz, 600 MHz to 100 GHz, 800 MHz to 10 GHz, 900 MHz to 3 GHz, or about 2.45 GHz; and/or v) wherein the input power IP1, for example the input power IP1 of the microwave generator, is 1000 W to 10000 W, for example 2100 W to 8000 W, 2500 W to 6700 W, 3000 W to 6000 W, 3200 W to 5500 W, or 4000 W to 5000 W; and/or vi) wherein precursor P1 comprises one or more of hexamethyldisiloxane (HMDSO), hexamethyldisilazane (HMDS), tetramethylsilane (TMS), trimethylborazole (TMB), tri(dimethylaminosilyl)-amino-di(dimethylamino)borane (TDADB), tris(trimethylsilyl)borate (TMSB), hexamethylcyclotrisiloxan (HMCTSO), octamethylcyclotetrasiloxan (OMCTS), decamethylcyclopentasiloxan (DMCPS), dodecamethylcyclohexasiloxan (DMCHS) diacetoxy-di-t-butoxysilane (DADBS), tetraethoxysilane (TEOS), tris(trimethylsilyloxy)vinylsilane (TTMSVS), vinyltriethoxysilane (VTES) and/or combinations thereof, for example the precursor P1 is HMDSO; and/or vii) wherein the precursor P1 comprises, for example consists of, the elements Si, C, O and H; and/or viii) the pulse pause PP1 between two pulses is 1 µs or more, for example 10 µs or more, 1 µs to 5 s, 0.1 ms to 10 ms, 0.2 ms to 2.0 ms, 0.3 ms to 1.2 ms, or 0.4 ms to 0.8 ms; and/or ix) the total time TT1 of irradiation is 0.1 s or more, for example 1 s or more, 1 s to 5 min, 3 s to 90 s, or 5 s to 40 s; and/or x) the ratio [µs/ms] of all pulse durations PD1 [µs] to all pulse pauses PP1 [ms] is 1 or more, for example 2 or more, 2 to 50, or 3 to 8; and/or xi) wherein the process pressure PR1 is 0.01 mbar to 500 mbar, for example 0.1 mbar to 10 mbar, 0.3 mbar to 5 mbar, 0.6 mbar to 2.0 mbar, or about 0.8 mbar; and/or xii) wherein the process temperature is decreasing, for example steadily decreasing, during the coating process; and/or xiii) wherein the process temperature PT1 is at least partially, for example at the time when coating process starts, 220° C. or more, for example 240° C. or more, 250° C. or more, 255° C. or more, 270° C. or more, or 280° C. or more; and/or xiv) wherein the flow rate of the precursor P1 is 0.1 to 500 sccm, for example 5 to 100 sccm, 8 to 30 sccm, or 10 to 15 sccm.

In some embodiments, all of the above parameters are fulfilled. This method may be particularly suitable for applying a coating and further improves the resistance in a wide pH range and at high pH values and further improves the chemical stability and adhesion properties.

In some embodiments, the coating process is performed in an apparatus provided according to WO 03 015 122 A1.

In some embodiments, surrounding the at least part of the surface, for example the inner surface, of the container with a precursor P1 may be understood as exposing the at least part of the surface, such as the inner surface, of the container with a precursor P1.

In some embodiments, surrounding the at least part of the surface, for example the inner surface, of the container with a precursor P1 may be understood as subjecting the at least part of the surface, such as the inner surface, of the container with a precursor P1.

In some embodiments, the flow rate of the precursor P1 is 0.1 to 500 sccm, for example 5 to 100 sccm, 8 to 30 sccm, or 10 to 15 sccm. In some embodiments, the precursor P1 is chemically pure with a degree of at least 99 wt. %.

In some embodiments, the pretreatment is a plasma pretreatment comprising the following steps:

providing a container, for example a glass container, comprising a surface;

performing a coating process on at least part, for example the inner surface, of the container, comprising:

a) surrounding the at least part of the surface, for example the inner surface, of the container with a precursor P2; and b) irradiating the precursor P2 to generate a plasma; wherein at least one, for example all, of the following parameters is/are fulfilled:

i) wherein the process temperature PT2 is room temperature to Tg of the glass of the glass element, for example room temperature to 450° C., room temperature to 400° C., room temperature to 320° C., or room temperature to about 280° C.; and/or ii) wherein the pulse duration PD2 of the plasma is 50 ms or less, for example 40 ms or less, for example 30 ms or less, 20 ms or less, 15 ms or less, 8 ms or less, 6 ms or less, 1 ms or less, or about 0.5 ms; and/or iii) wherein the pulse duration PD2 of the plasma is 0.1 ms or more, for example 0.2 ms or more, 0.3 ms or more, or 0.5 ms or more; and/or iv) wherein the irradiation is carried out by a microwave generator, for example wherein the ray has a frequency of 300 MHz to 300 GHz, 600 MHz to 100 GHz, 800 MHz to 10 GHz, 900 MHz to 3 GHz, or about 2.45 GHz; and/or v) wherein the input power IP2, for example the input power IP2 of the microwave generator, is 1000 W to 10000 W, for example 2500 W to 8000 W, 4000 W to 8000 W, 5000 W to 7000 W, 5000 W to 6500 W, or 5250 W to 5750 W; and/or vi) the precursor P2 comprises argon, oxygen and/or nitrogen, and/or the precursor P2 is air; and/or vii) wherein the precursor P2 comprises, for example consists of, the elements N, e.g. $N_2$, and/or O, e.g. $O_2$; and/or viii) the pulse pause PP2 between two pulses is 1 µs or more, for example 10 µs or more, 1 µs to 5 s, 0.1 ms to 10 ms, 0.5 ms to 2.0 ms, 1.5 ms to 2.0 ms, or about 1.8 ms; and/or ix) the total time TT2 of irradiation is 0.1 s or more, for example 1 s or more, 1 s to 5 min, or 5 s to 15 s; and/or x) the ratio [ms/ms] of all pulse durations PD2 [ms] to all pulse pauses PP2 [ms] is 0.05 or more, for example 0.1 or more, 0.15 to 5, or 0.2 to 0.5; and/or xi) wherein the process pressure PR2 is 0.01 mbar to 500 mbar, for example 0.1 mbar to 100 mbar, 0.5 mbar to 10 mbar, 0.8 mbar to 6.0 mbar, or 1.0 mbar to 4.0 mbar; and/or xii) wherein the process temperature PT2 is increasing, for example steadily increasing, during the plasma pretreatment; and/or xiii) wherein the process temperature PT2 is at least partially, for example at the time when the plasma pretreatment process ends, 220° C. or more, for example 240° C. or more, 250° C. or more, 255° C. or more, 270° C. or more, or about 280° C. or more; and/or xiv) wherein the flow rate of the precursor P2 is 0.1 to 500 sccm, for example 5 to 100 sccm, 8 to 50 sccm, or 20 to 30 sccm.

This method may be particularly suitable for pretreating a surface and further improves the resistance in a wide pH range and at high pH values and further improves the chemical stability and adhesion properties.

In some embodiments, surrounding the at least part of the surface, for example the inner surface, of the container with a precursor P2 may be understood as exposing the at least part of the surface, such as the inner surface, of the container with a precursor P2.

In some embodiments, surrounding the at least part of the surface, for example the inner surface, of the container with a precursor P2 may be understood as subjecting the at least part of the surface, such as the inner surface, of the container with a precursor P2.

In some embodiments, the inner surface of the container, for example the entire inner surface of the container, is coated. Thus, a pharmaceutical composition is further protected. In some embodiments, the outer surface of the container is uncoated. In some embodiments, the inner surface of the container, for example the entire inner surface of the container, is coated and the outer surface of the container is uncoated. Thus, a pharmaceutical composition is further protected. If the outer surface is uncoated, the leaching of the one or more type(s) of ions and/or compounds may be, for example is, similar, for example identical, to the leaching of the base material of the container. In some embodiments, the coating is obtainable as described in the European patent application EP 21 164 784, which is incorporated herein by reference.

In some embodiments, the base material of the coated container comprises, for example consists of, glass, for example borosilicate glass or alumino borosilicate glass. In some embodiments, the composition of the glass comprises, for example consists of, in mass-%:

$SiO_2$: 30 to 98%, for example 50 to 90% or 70.0 to 74.0%;

$B_2O_3$: 0 to 30%, for example 3 to 20% or 7.0 to 16.0%;

$Al_2O_3$: 0 to 30%, for example 1 to 15% or 3.0 to 6.5%;

$X_2O$: 0 to 30%, for example 1 to 15% or 2.0 to 7.2%, wherein X is selected from Na, K, and/or Li;

YO: 0 to 30%, for example 0.1 to 5% or 0.5 to 1.0%, wherein Y is selected from Ca, Mg, and/or Ba; and unavoidable impurities, wherein the total amount of all unavoidable impurities is 5 wt.-% or less, for example 2.5 wt.-% or less, 1.0 wt.-% or less, 0.5 wt.-% or less, 0.1 wt.-% or less, or 0.01 wt.-% or less; and/or the impurities are selected from Fe, Ti, Zn, Cu, Mn and Co.

In some embodiments, the base material of the coated container comprises, for example consists of, a polymer, for example cyclic olefin copolymer COC and/or cyclic olefin polymer COP. For example, the polymer comprises an antioxidant.

In some embodiments, the base material of the coated container comprises:

one or more compound(s) comprising C, for example one or more compound(s) comprising C except compounds comprising Si; and/or one or more monomer(s), for example norbornene, norbornane, and/or bicyclopentane; and/or one or more antioxidant(s), for example wherein the antioxidant(s) is/are selected from the group consisting of phenolic antioxidants, pentaerythritol tetrakis(3-(3, 5-di-tert-butyl-4-hydroxyphenyl)propionate and/or dibutylhydroxytoluene (BHT); phosphite antioxidants, tris(2,4-ditert-butylphenyl)phosphite; phosphonite antioxidants, for example tetrakis(2,4-di-tert-butylphenyl)[1,1-biphenyl]-4,4'-diylbisphosphonite; and thioether antioxidants.

In some embodiments, the brimful volume of the container is 0.1 ml to 1000 ml, for example, 0.5 ml to 500 ml, 1 ml to 250 ml, 2 ml to 30 ml, 3 ml to 15 ml, about 1 ml, 2 ml, 3 ml, 4, ml, 5 ml, 6 ml, 7 ml, 8 ml, 9 ml, 10 ml, 11 ml, 12 ml, 13 ml, 14 ml or 15 ml; or 5 to 15 ml. In some embodiments, the coated container is a coated pharmaceutical container, a coated vial, coated syringe, coated ampoule or coated cartridge. In some embodiments, the coated container is a coated pharmaceutical container, for example a cartridge or syringe, for example syringe, wherein the smaller opening of the cartridge or syringe is closed, for example by a tip cap and/or stopper. In some embodiments, the at least part of the coated surface, the at least part of the alkaline treated surface, and the at least part of the acidic treated surface are the same; and/or the at least part of the coated surface comprises at least part of the inner surface, for example the at least part of the coated surface is the surface which is in contact with a solution when the coated container stands on an even ground and is filled with the solution having a volume of 10% or more, for example 30% or more, 90% or more, or 90%, with respect to the brimful volume [vol./vol.] of the coated container; and/or the at least part of the coated surface is the surface which is in contact with a solution when the coated container is filled to the filling volume according to ISO 4802-2:2016(E); section 7.2. If one or more of the above parameters are fulfilled, the security of the pharmaceutical composition during the storage in the coated container can be further improved.

In some embodiments, the base material of the container comprises the one or more type(s) of ions and/or compounds. Thus, the reliable determination of the herein described values can be improved.

An exemplary embodiment provided according to the present invention is a kit, comprising:

i) a coated container, for example as described herein, and ii) a data sheet or storage medium comprising the results of the quality evaluation obtainable by the method as described herein.

Definitions

Contact time herein is the time the composition, such as an acidic composition, is in contact with the at least a part of the surface. Not included in the contact time is the time needed to prepare the sample or to prepare the sample for the next step. The contact time may be the time the sample is in an autoclave, which is running and set to a specific pressure and temperature.

Herein a heat treated surface is a coated surface which has been heat treated. Herein the base material is the material of the uncoated container, e.g. glass or polymer. Ambient pressure and temperature herein is the pressure measured at the time the method is performed, e.g. 1 bar and 20° C. Herein an acidic composition is a composition comprising, for example consisting of, an acid, e.g. HCl, and a solvent, e.g. water and/or an organic solvent. If not stated otherwise a ratio herein always refers to the ratio of volumes, i.e. [vol./vol.]. Herein monomers are the monomers, which have been used to produce the base material of the coated container comprising, for example consisting of, a polymer. Since the industrial production methods of polymers are well known, a person skilled in the art has no problem to extrapolate from the polymer to the corresponding monomer(s). Well-known monomers are, for example, substituted or unsubstituted, for example unsubstituted, norbornene, norbornane and/or bicyclopentane. Unavoidable impurities herein are impurities, which may be contained in the educts, e.g. Fe, Ti, Zn, Cu, Mn, Co. For example, the total amount of all unavoidable impurities in the base material of the coated container is 5 wt.-% or less, for example 2.5 wt.-% or less, 1.0 wt.-% or less, 0.5 wt.-% or less, 0.1 wt.-% or less, or 0.01 wt.-% or less. Herein the total time of irradiation is the sum of all durations of the pulses and the pulse pauses. The temperature during the pretreatment and the coating process herein refers to the temperature measured in the middle of the glass element with a pyrometer. In case the container is a container having a cylindrical part, the temperature during the coating process is measured at the middle of the cylindrical part of the container, e.g. of the vial. If not stated otherwise, the input power is the forward power measured between the irradiation generator, e.g. the microwave generator and the glass element, measured for example by a MW-Diode (ACTP-1502; damping 10 dB). Herein Tg (glass transition temperature) is measured by differential scanning calorimetry (DSC). Ultrapure water herein is water of purity 1 analogue DIN ISO 3696 with $\leq$0.1 $\mu$S/cm at 25° C. Even if the method for a quality evaluation described herein refers to a coated container, a person skilled in the art recognizes that the method can also be applied to an uncoated container, e.g. to obtain a reference value. If not stated otherwise, the brimful volume herein refers to the brimful volume of the container, for example the coated container.

Parameters and Methods

The value for i can be obtained as described herein. For example, i is determined by the following method $L_i$.

Method $L_i$:

Herein, an exemplary embodiment provided according to the present invention is the following method (method $L_i$), comprising:

providing a container, for example a coated container;
  in case the container exhibits two openings, e.g. a syringe:
    covering the smaller opening with a closure, e.g. a tip cap;
  filling 0.9× (brimful volume) of a 0.005 mol/l KOH-solution (KOH: Potassium hydroxide hydrate ≥99.995%, Suprapur® (Merck), demineralized water (ultrapure water of purity 1 analogue DIN ISO 3696 with ≤0.1 $\mu$S/cm at 25° C.)) in the pharmaceutical container;
  closing the container with a closure seal, e.g. aluminum foil or a stopper;
  inserting the container in an autoclave (e.g. Systec, model DX-150 (PM-CA-0001-01));
  treating the container for 3 hours at 121° C. and 1 bar above ambient pressure, e.g. 2 bar;

opening the closure seal;
  emptying the container;
  filling and rinsing the container two times with deionized water;
  in case the container is a glass container: filling 0.9× (brimful volume) of 0.1 mol/l HCl-solution (hydrochloric acid 30% Suprapur® (Merck)) diluted with demineralized water (ultrapure water of purity 1 analogue DIN ISO 3696 with ≤0.1 $\mu$S/cm at 25° C.)), i.e. the same volume as used in the alkaline treatment, in the pharmaceutical container, or
  in case the container is a polymer container: filling 0.9× (brimful volume) of 0.1 mol/l HCl-solution (hydrochloric acid 30% Suprapur® (Merck)) diluted with demineralized water (ultrapure water of purity 1 analogue DIN ISO 3696 with ≤0.1 $\mu$S/cm at 25° C.) and isopropanol (1:1/vol %:vol %), i.e. the same volume as used in the alkaline treatment, in the pharmaceutical container;
  closing the container with a closure seal;
  inserting the container in an autoclave (e.g. Systec, model DX-150 (PM-CA-0001-01));
  treating the container for 6 hours at 121° C. and 1 bar above ambient pressure;
  opening the closure seal;
  in case the container is a glass container: analyzing the content (mg/l) of one or more type(s) of ions and/or compounds, for example [Na] ions, in the 0.1 mol/l HCl-solution by FAAS analysis, e.g. using Varian SpectrAA 280 FS (PE 3-004), to obtain the value [mg/l] for the leaching of one or more type(s) of ions and/or compounds, for example [Na] ions;
  in case the container is a polymer container: analyzing the content (mg/l) of one or more type(s) of ions and/or compounds, for example the antioxidant and/or organic compounds, in the 0.1 mol/l HCl-solution by LC-MS, e.g. using Waters I-Class UPLC system with Waters Xevo qTOF, to obtain the value [mg/l] for the leaching of one or more type(s) of ions and/or compounds, for example the antioxidant and/or organic compounds;
  calculating the value (mg/cm²) by the following formula: A*B/C, wherein A is the above value [mg/l] for the leaching of one or more type(s) of ions and/or compounds, wherein B is 0.9× brimful volume, and wherein C is the wetted inner surface of the container (in cm²) to obtain the value [mg/cm²] for the leaching of one or more type(s) of ions and/or compounds, for example Na ions or the antioxidant, i.e. the value i.

An alternative embodiment comprises a method (method $L_i$), comprising the steps:

providing a container, for example a coated container;
  in case the container exhibits two openings, e.g. a syringe:
    covering the smaller opening with a closure, e.g. a tip cap;
  filling 0.9× (brimful volume) of a 0.005 mol/l KOH-solution (KOH: Potassium hydroxide hydrate ≥99.995%, Suprapur® (Merck), demineralized water (ultrapure water of purity 1 analogue DIN ISO 3696 with ≤0.1 $\mu$S/cm at 25° C.)) in the pharmaceutical container;
  closing the container with a closure seal, e.g. aluminum foil or a stopper;
  inserting the container in an autoclave (e.g. Systec, model DX-150 (PM-CA-0001-01));
  treating the container for 3 hours at 121° C. and 1 bar above ambient pressure, e.g. 2 bar;

opening the closure seal;

emptying the container;

filling and rinsing the container two times with deionized water;

filling 0.9× (brimful volume) of 0.1 mol/l HCl-solution (hydrochloric acid 30% Suprapur® (Merck)) diluted with demineralized water (ultrapure water of purity 1 analogue DIN ISO 3696 with ≤0.1 μS/cm at 25° C.)), i.e. the same volume as used in the alkaline treatment, in the pharmaceutical container;

closing the container with a closure seal;

inserting the container in an autoclave (e.g. Systec, model DX-150 (PM-CA-0001-01));

treating the container for 6 hours at 121° C. and 1 bar above ambient pressure;

opening the closure seal;

emptying the container;

filling and rinsing the container two times with deionized water;

drying the container, for example with air;

filling 0.9× (brimful volume) of n-hexane, i.e. the same volume as used in the alkaline treatment, in the pharmaceutical container;

shaking the pharmaceutical container in an orbital shaker (80 rpm) for 30 min at room temperature;

analyzing the content (mg/l) of one or more type(s) of ions and/or compounds, for example the antioxidant and/or organic compounds, in the n-hexane-solution by LC-MS, e.g. using Waters I-Class UPLC system with Waters Xevo qTOF, to obtain the value [mg/l] for the leaching of one or more type(s) of ions and/or compounds, such as the antioxidant and/or organic compound;

calculating the value (mg/cm$^2$) by the following formula: A*B/C, wherein A is the above value [mg/l] for the leaching of one or more type(s) of ions and/or compounds, wherein B is 0.9× brimful volume, and wherein C is the wetted inner surface of the container (in cm$^2$); to obtain the value [mg/cm$^2$] for the leaching of one or more type(s) of ions and/or compounds, for example Na ions or the antioxidant, i.e. the value i.

The value o may be obtained by several methods and for example the value o is determined as described herein. The value o is either the content (mg/cm$^2$) of one or more type(s) of ions and/or compounds of the base material of the coated container and/or, obtainable by the method L$_o$ as described herein, the value o is obtainable by the method L$_o$ as described herein.

If the same but uncoated container, which is used to obtain value i is available, then value o may be obtainable by method L$_i$ described above using the uncoated container to obtain the content (mg/cm$^2$) of one or more type(s) of ions and/or compounds of the base material of the coated container. If the values i and o should be obtained by only one container, value i is obtainable be the method L$_i$ above and value o is obtainable by the method L$_o$ below. For example, o is obtainable by the method L$_o$. The method L$_o$ can be used for a container, which is coated or uncoated on the outside. For example, in the methods L$_i$ and L$_o$, the biggest opening faces upwards.

Method L$_o$:

Herein, the method L$_o$, comprises:

providing a container, for example the same container as used for the method L$_i$ above;

in case the container exhibits two openings, e.g. a syringe: covering the smaller opening with a closure, e.g. a tip cap;

filling 0.9× (brimful volume) of a solution in the pharmaceutical container;

closing the container with a closure seal;

inserting the container in a beaker, e.g. a stainless steel or aluminum beaker;

filling the beaker with a 0.005 mol/l KOH-solution (KOH: Potassium hydroxide hydrate ≥99.995%, Suprapur® (Merck), demineralized water (ultrapure water of purity 1 analogue DIN ISO 3696 with ≤0.1 μS/cm at 25° C.)) until a level is reached which is the same as the level in the container;

closing the beaker with a closure;

inserting the beaker in an autoclave (e.g. Systec, model DX-150 (PM-CA-0001-01));

treating the beaker for 3 hours at 121° C. and 1 bar above ambient pressure, e.g. 2 bar;

opening the closure of the beaker;

emptying the beaker;

filling and rinsing the beaker two times with deionized water and washing the outside of the container by rinsing the outer surface with deionized water;

inserting the container again in the beaker, e.g. the stainless steel or aluminum beaker;

in case the container is a glass container: filling the beaker with a 0.1 mol/l HCl-solution (hydrochloric acid 30% Suprapur® (Merck)) diluted with demineralized water (ultrapure water of purity 1 analogue DIN ISO 3696 with ≤0.1 μS/cm at 25° C.)))) until a level is reached which is the same as the level in the container, i.e. the same volume as used in the alkaline treatment, or in case the container is a polymer container: filling the beaker with a 0.1 mol/l HCl-solution (hydrochloric acid 30% Suprapur® (Merck)) diluted with demineralized water (ultrapure water of purity 1 analogue DIN ISO 3696 with ≤0.1 μS/cm at 25° C.) and isopropanol (1:1/vol %:vol %), until a level is reached which is the same as the level in the container, i.e. the same volume as used in the alkaline treatment;

closing the beaker with a closure;

inserting the beaker in an autoclave (e.g. Systec, model DX-150 (PM-CA-0001-01));

treating the beaker for 6 hours at 121° C. and 1 bar above ambient pressure;

opening the beaker;

in case the container is a glass container: analyzing the content (mg/l) of one or more type(s) of ions and/or compounds, for example [Na] ions, in the 0.1 mol/l HCl-solution by FAAS analysis, e.g. using Varian SpectrAA 280 FS (PE 3-004), to obtain the value [mg/l] for the leaching of one or more type(s) of ions and/or compounds, for example [Na] ions;

in case the container is a polymer container: analyzing the content (mg/l) of one or more type(s) of ions and/or compounds, for example the antioxidant and/or organic compounds, the antioxidant, in the 0.1 mol/l HCl-solution by LC-MS, e.g. using Waters I-Class UPLC system with Waters Xevo qTOF, to obtain the value [mg/l] for the leaching of one or more type(s) of ions and/or compounds, for example the antioxidant and/or organic compounds;

calculating the value (mg/cm') by the following formula: A*B/C, wherein A is the above value [mg/l] for the leaching of one or more type(s) of ions and/or compounds, wherein B is the volume of the solution in the beaker, and wherein C is the wetted outer surface of the container (in cm$^2$); to obtain the value [mg/cm$^2$] for the leaching of one or more type(s) of ions and/or compounds, i.e. the value o.

Heat Treatment

In some embodiments, a heat treatment can be performed before the alkaline treatment. Thereby, a pharmaceutical glass container is tempered at 330° C. for 60 min in a pre-heated oven at ambient pressure. For the alkaline treatment either a heat treated pharmaceutical glass container can be used or a pharmaceutical glass container which has not been heat treated. If not stated otherwise, a pharmaceutical glass container is a not heat treated pharmaceutical glass container.

LC-MS

LC-MS was employed to determine the content of non-volatile organic compounds (NVOCs) in a solution, if a polymer container is used. A Waters I-Class UPLC system with Waters Xevo qTOF (APCI) was used, together with a Waters Ascquity UPLC BEH column (100×2.1 mm, 1.7 μm) with a C18 pre column (USP code L1). The following experimental parameters were employed: injection volume of 2 μl; oven temperature 40° C.; eluent A: water+5 mmol/L ammonium acetate; eluent B: methanol+5 mmol/L ammonium acetate; flow: 0.3 mL/min; gradient (AB) 70/30/0.5 min (hold), to 20/80 within 1.0 min, to 16/84 within 10.5 min, to 6/94 within 1.0 min, to 0/100 within 5.0 min/7.0 min (hold), to 70/30 within 0.5 min/5.5 min (hold); APCI probe temperature: 450° C.; source temperature: 120° C.; cone gas flow: 150 L/h; desolvation gas flow: 1000 L/h; corona voltage: 3.0 kV; scan m/z: 100 to 2000 amu (positive and negative); ion source: APCI (atmospheric pressure chemical ionization); Mode: MSE; High CE: 20.00 to 45.00 eV; low CE: 4.00 eV. The detection threshold for the LC-MS method has been estimated as 0.05 mg/L.

FAAS (Furnace Atomic Absorption Spectrometry)

FAAS was employed to determine the content of inorganic ions in a solution if a glass container is examined. The detection threshold for the FAAS method has been estimated as 0.01 mg/L.

Items

In summary, embodiments are the following. The scope of protection is defined by the claims. The combination of two or more embodiments, e.g. 3, 4 or 8 embodiments is also provided. Definitions and general statements herein also apply for the following embodiments.

1. Method for a quality evaluation of a coated container, comprising the following steps, for example in this order:

providing a coated container;

performing an alkaline treatment on at least part of the coated surface of the coated container to obtain an alkaline treated surface;

performing an acidic treatment on at least part of the alkaline treated surface to obtain an acidic treated surface and a treated acidic solution; and quantifying the leaching of one or more type(s) of ions and/or compounds of the at least part of the acidic treated surface to obtain results of the quality evaluation.

2. Method for a quality evaluation of a coated container, for example according to item 1, comprising the steps, for example in this order:

providing a coated container;

performing a heat treatment on at least part of the coated container to obtain a heat treated surface;

performing an alkaline treatment on at least part of the heat treated surface to obtain an alkaline treated surface;

performing an acidic treatment on at least part of the alkaline treated surface to obtain an acidic treated surface and a treated acidic solution; and quantifying the leaching of one or more type(s) of ions and/or compounds of the at least part of the acidic treated surface to obtain results of the quality evaluation.

3. Method according to any one of the preceding items, wherein the alkaline treatment comprises, for example consists of, the step(s), for example in this order:

bringing an alkaline solution exhibiting a pH of >7 to 14, for example 9 to 13, 9.5 to 12.5, or 11.7, in contact with at least part of the surface of the coated container, for example of the heat treated surface; and optionally filling and rinsing, for example two times or more, such as three times, the at least part of the alkaline treated surface with ultrapure water.

4. Method according to any one of the preceding items, wherein one or more of the following conditions are fulfilled:

i) the contact time of the alkaline solution and the at least part of the coated surface and/or heat treated surface is 1 second to 1 week, for example 1 minute to 1 day, 1 hour to 5 hours, or 3 hours; and/or ii) the pressure outside the container is set to 0.1 bar to 10 bar, for example 0.5 bar to 4 bar, or 1 bar above ambient pressure; and/or iii) the temperature outside the container is set to 20° C. to 200° C., for example 50° C. to 200° C., 100° C. to 150° C., or 121° C.; and/or iv) wherein the container is filled with the solution to a volume of 10% to 100%, for example 30% to 95%, or 90% with respect to the brimful volume [vol./vol.] of the container; and/or v) the solution comprises, for example consists of, water, for example ultrapure water, and a base, for example one base, XOH, wherein X is selected from Na, K, and/or Li; and/or vi) the concentration of the base is 0.0001 mol/l to 1 mol/l, for example 0.001 mol/l to 0.1 mol/l, 0.003 mol/l to 0.020 mol/l, or 0.005 mol/l; and/or vii) wherein the container is closed, for example by a closure seal, during the alkaline treatment.

5. Method according to any one of the preceding items, wherein the heat treatment comprises, for example consists of:

tempering the container.

6. Method according to any one of the preceding items, wherein one or more of the following conditions are fulfilled:

i) the time of tempering is 1 min to 1 day, for example 30 min to 6 hours, or 60 min; and/or ii) the temperature during the tempering outside the container is set to 25° C. to Tg of the base material of the container, for example 50° C. to 500° C., 100° C. to 400° C., 300° C. to 400° C. or 330° C.; and/or iii) the pressure during the tempering is set to 0.1 bar to 10 bar, for example is ambient pressure.

7. Method according to any one of the preceding items, wherein the acidic treatment comprises, for example consists of:

bringing an acidic solution having a pH of <7, for example 0 to 6, for example 0 to 3, 0 to 2, or 1, in contact with at least part of the alkaline treated surface to obtain an acidic treated surface and a treated acidic solution.

8. Method according to any one of the preceding items, wherein the acidic treatment comprises, for example consists of:

bringing an acidic solution in contact with at least part of the alkaline treated surface to obtain an acidic treated surface and a treated acidic solution:

wherein one or more of the following conditions are fulfilled:

i) the contact time of the acidic solution and the at least part of the alkaline treated surface is 1 second to 1 week, for example 1 minute to 1 day, 1 hour to 10 hours, or 6 hours; and/or ii) the pressure outside the container is set to 0.1 bar to 10 bar, for example 0.5 bar to 4 bar, or 1 bar above ambient pressure; and/or iii) the temperature outside the container is set to 20° C. to 200° C., for example 50° C. to 200° C., 100° C. to 150° C., or 121° C.; and/or iv) wherein the container is filled with the solution to the filling volume according to ISO 4802-2:2016(E); section 7.2; and/or v) wherein the container is filled with the solution until a volume of 10% to 100%, for example 30% to 95%, or 90% with respect to the brimful volume [vol./vol.] of the container is reached; and/or vi) the solution comprises, for example consists of, water, for example ultrapure water; and an acid, for example one acid, HX, wherein X is selected from F, Cl, Br, and/or I; and/or vii) the concentration of the acid is 0.0001 mol/l to 1 mol/l, for example 0.01 mol/l to 0.5 mol/l, 0.05 mol/l to 0.2 mol/l, or 0.1 mol/l; and/or viii) wherein the solution comprises an organic solvent, for example an alcohol, ester and/or ether, such as isopropanol; and/or;

ix) wherein the ratio [vol./vol.] of water to organic solvent is 0.1 to 10, for example 0.3 to 0.7, 0.4 to 0.6, or 0.5; and/or x) wherein the container is closed, for example by a closure seal, during the acidic treatment.

9. Method according to any one of the preceding items, wherein quantifying the leaching of one or more type(s) of ions and/or compounds of the at least part of the acidic treated surface to obtain results of the quality evaluation is quantifying the content of one or more type(s) of ions and/or compounds in the treated acidic solution to obtain results of the quality evaluation.

10. Method according to any one of the preceding items, wherein quantifying the leaching of one or more type(s) of ions and/or compounds of the at least part of the acidic treated surface to obtain results of the quality evaluation is quantifying the content of one or more type(s) of ions, for example alkali metal ions, such as [Na] ions, in the treated acidic solution to obtain results of the quality evaluation.

11. Method according to any one of the preceding items, wherein quantifying the leaching of one or more type(s) of ions and/or compounds of the at least part of the acidic treated surface to obtain results of the quality evaluation is quantifying the content of:

one or more compound(s) comprising C, for example one or more compound(s) comprising C except compounds comprising Si; and/or one or more monomer(s), for example norbornene, norbornane, and/or bicyclopentane; and/or one or more antioxidant(s), for example wherein the antioxidant(s) is/are selected from the group consisting of phenolic antioxidants, pentaerythritol tetrakis(3-(3, 5-di-tert-butyl-4-hydroxyphenyl)propionate and/or dibutylhydroxytoluene (BHT); phosphite antioxidants, tris(2,4-ditert-butylphenyl)phosphite; phosphonite antioxidants, for example tetrakis(2,4-di-tert-butylphenyl)[1,1-biphenyl]-4,4'-diylbisphosphonite; and thioether antioxidants, wherein the antioxidant(s) is/are phenolic antioxidant(s), pentaerythritol tetrakis(3-(3,5-di-tert-butyl-4-hydroxyphenyl)propionate, in the treated acidic solution to obtain results of the quality evaluation.

12. Method according to any one of the preceding items, wherein the quantifying is performed using chromatography; for example gas chromatography (GC), for example head space-gas chromatography (HS-GC), gas chromatography-mass spectrometry (GC-MS), and/or head space-gas chromatography-mass spectrometry (HS-GC-MS); and/or liquid chromatography (LC), for example liquid chromatography-mass spectrometry (LC-MS); and/or wherein the quantifying is performed using inductively coupled plasma-atomic emission spectroscopy (ICP-AES), inductively coupled plasma-optical emission spectrometry (ICP-OES), inductively coupled plasma-mass spectrometry (ICP-MS), graphite furnace atomic absorption spectrometry (GFAAS), and/or flame atomic absorption spectrometry (FAAS); and/or wherein the quantifying is performed using a titration process.

13. Method, for example according to any one of the preceding items, comprising the following step(s):

using the results of the quality evaluation obtainable by the method according to any one of the preceding items to evaluate the suitability of a coated container for the storage of a solution, for example a pharmaceutical solution; and/or using the results of the quality evaluation obtainable by the method according to any one of the preceding items to evaluate the stability of the coating of the coated container, for example the coated pharmaceutical container; and/or connecting and/or linking the results of the quality evaluation obtainable by the method according to any one of the preceding items to a coated container, for example a coated pharmaceutical container.

14. Method, for example according to any one of the preceding items, comprising the following steps, for example in this order:

producing a first and a second coated container with the same production method;

quantifying the leaching of the first coated container by a method according to any one of the preceding items, for example method $L_i$ described herein, to obtain results of the quality evaluation of the first coated container; and applying and/or using the results of the quality evaluation of the first coated container to determine the suitability of the second coated container for the storage of a solution, for example in the second container, and/or using the results of the quality evaluation for the quality control of the first and/or second container; and/or applying and/or using the results of the quality evaluation of the first coated container to determine the suitability of the second coated container for the storage of a solution, for example in the second container, wherein the first coated container exhibits a leaching of one or more type(s) of ions and/or compounds, [Na] ions, of <90%; for example <50%, <30% with respect to the limit of hydrolytic resistance for Type 1 glass containers; and/or applying and/or using the results of the quality evaluation of the first coated container to determine the suitability of the second coated container for the storage of a solution, for example in the second container, wherein the first coated container exhibits a leaching of one or more type(s) of ions and/or compounds, for example [Na] ions, of <90%; for example <50%, or <30% with respect to the limit of the maximum values in the hydrolytic resistance container surface test according to ISO 4802-2:2016(E), section 9.2, Classes HCF1 and HCF2 ISO 4802-2:2016(E); and/or applying and/or using the results of the quality evaluation of the first coated container to determine the suitability of the second coated container for the storage of a solution, for example in the second container, wherein the first coated container exhibits a leaching of one or more type(s) of ions and/or compounds of 10.00 mg/l or less, for example 5.00 mg/l or less, 4.5 mg/l or less, 4.1 mg/l or less, 3.2 mg/l or less, 2.5 mg/l or less, 2.0 mg/l or less, 1.5 mg/l or less, 1.2 mg/l or less, 1.0 mg/l or less, 0.75 mg/l or less, 0.50 mg/l or less, 0.40 mg/l or less, 0.30 mg/l or less, 0.2 mg/l or less, or 0.1 mg/l or less.

15. Method according to any one of the preceding items, comprising:

filling the first coated container with a solution, for example a pharmaceutical composition, such as a pharmaceutical solution having a pH of 4 to 14, for example having a pH of >7 to 12 or having a pH of 9 to 11.

16. Use of the results of the quality evaluation obtainable by the method according to any one of items 1 to 12 to evaluate the suitability of a coated container, for example a coated pharmaceutical container, for the storage of a solution, for example a pharmaceutical solution and/or the quality control of the production of a coated container.

17. Coated container, wherein the leaching of one or more type(s) of ions and/or compounds is obtainable by the method according to any one of the preceding items, for example is obtainable by the method $L_i$ described herein, and wherein the leaching of one or more type(s) of ions and/or compounds is 5.00 mg/l or less.

18. Method, use and/or coated container, for example according to any one of the preceding items, wherein the leaching of one or more type(s) of ions and/or compounds is obtainable by the method according to any one of the preceding items, for example is obtainable by the method $L_i$ described herein, and wherein the leaching of one or more type(s) of ions and/or compounds is 10.00 mg/l or less, for example 5.00 mg/l or less, 4.5 mg/l or less, 4.1 mg/l or less, 3.2 mg/l or less, 2.5 mg/l or less, 2.0 mg/l or less, 1.5 mg/l or less, 1.2 mg/l or less, 1.0 mg/l or less, 0.75 mg/l or less, 0.50 mg/l or less, 0.40 mg/l or less, 0.30 mg/l or less, 0.2 mg/l or less, or 0.1 mg/l or less.

19. Method, use and/or coated container, for example according to any one of the preceding items, wherein the leaching of one or more type(s) of ions and/or compounds obtainable by the method according to any one of the preceding items, for example obtainable by the method $L_i$ described herein, is 100% or less; for example 90% or less; 50% or less, 50% or less, or 1% or more and 30% or less; with respect to the limit of the maximum values in the hydrolytic resistance container surface test according to ISO 4802-2:2016(E), section 9.2, Classes HCF1 and HCF2 ISO 4802-2:2016(E).

20. Method, use and/or coated container, for example according to any one of the preceding items, wherein the leaching of one or more type(s) of ions and/or compounds obtainable by the method according to any one of the preceding items, for example obtainable by the method $L_i$ described herein, is a;

wherein a≤b*c;

wherein, if 0.9× (brimful volume) of the container is ≤1 ml, b is 5.00 mg/l, wherein, if 0.9× (brimful volume) of the container is >1 ml and ≤2 ml, b is 4.50 mg/l, wherein, if 0.9× (brimful volume) of the container is >2 ml and ≤3 ml, b is 4.10 mg/l, wherein, if 0.9× (brimful volume) of the container is >3 ml and ≤5 ml, b is 3.20 mg/l, wherein, if 0.9× (brimful volume) of the container is >5 ml and ≤10 ml, b is 2.50 mg/l, wherein, if 0.9× (brimful volume) of the container is >10 ml and ≤20 ml, b is 2.00 mg/l, wherein, if 0.9× (brimful volume) of the container is >20 ml and ≤50 ml, b is 1.50 mg/l, wherein, if 0.9× (brimful volume) of the container is >50 ml and ≤100 ml, b is 1.20 mg/l, wherein, if 0.9× (brimful volume) of the container is >100 ml and ≤200 ml, b is 1.00 mg/l, wherein, if 0.9× (brimful volume) of the container is >200 ml and ≤500 ml, b is 0.75 mg/l; and wherein, if 0.9× (brimful volume) of the container is >500 ml, b is 0.50 mg/l; and wherein c is 1.00, for example 0.90, 0.80, 0.70, 0.60, 0.50, 0.40, 0.30, 0.20, 0.15, 0.10, 0.08, or 0.05.

21. Method, use and/or coated container, for example according to any one of the preceding items, wherein the leaching of one or more type(s) of ions and/or compounds obtainable by the method according to any one of the preceding items, for example obtainable by the method $L_i$ described herein, is a; wherein a is 0 mg/l or more, for example 0.001 mg/l or more, 0.01 mg/l or more, 0.1 mg/l or more, or 0.2 mg/l or more.

22. Method, use and/or coated container, for example according to any one of the preceding items, wherein the coated container comprises an inner surface and an outer surface, wherein at least a part of the inner surface is coated by a coating; and wherein the coated container exhibits in the following equation:

$$i/o \leq d$$

a value d ($[mg/cm^2]/[mg/cm^2]$) of 0.90, wherein i is the leaching ($mg/cm^2$) of one or more type(s) of ions and/or compounds obtainable by the method according to any one of the preceding items, for example by the method $L_i$ as described herein; and wherein o is the leaching ($mg/cm^2$) of one or more type(s) of ions and/or compounds of the base material of the coated container and/or is obtainable by the method $L_o$ as described herein.

23. Method, use and/or coated container, for example according to any one of the preceding items, wherein d is 0.80, for example 0.70, 0.60, 0.50, 0.40, 0.30, 0.20, 0.14, 0.10, or 0.07.

24. Method, use and/or coated container, for example according to any one of the preceding items, wherein the coated container exhibits in the following equation: i/o≥e a value e ($[mg/cm^2]/[mg/cm^2]$) of 0.00, for example 0.01, 0.02, 0.05, 0.10, 0.12, or 0.14.

wherein i is the leaching (mg/cm$^2$) of one or more type(s) of ions and/or compounds obtainable by the method according to any one of the preceding items, for example by the method $L_i$ as described herein; and wherein o is the leaching (mg/cm$^2$) of one or more type(s) of ions and/or compounds of the base material of the coated container and/or is obtainable by the method $L_o$ as described herein.

25. Method, use and/or coated container, for example according to any one of the preceding items, wherein i is $1.0*10^{-10}$ mg/cm$^2$ to $1.0*10^{-3}$ mg/cm$^2$, for example $1.0*10^{-8}$ mg/cm$^2$ to $6.5*10^{-4}$ mg/cm$^2$, $1.0*10^{-7}$ mg/cm$^2$ to $6.0*10^{-4}$ mg/cm$^2$, $1.0*10^{-6}$ mg/cm$^2$ to $3.0*10^{-4}$ mg/cm$^2$, or $7.0*10^{-6}$ mg/cm$^2$ to $3.0*10^{-5}$ mg/cm$^2$.

26. Method, use and/or coated container, for example according to any one of the preceding items, wherein o is $1.1*10^{-5}$ mg/cm$^2$ to $1.0*10^{-1}$ mg/cm$^2$, for example $1.0*10^{-4}$ mg/cm$^2$ to $1.0*10^{-2}$ mg/cm$^2$, $6.5*10^{-4}$ mg/cm$^2$ to $1.0*10^{-3}$ mg/cm$^2$, or $6.8*10^{-4}$ mg/cm$^2$ to $7.5*10^{-4}$ mg/cm$^2$.

27. Method, use and/or coated container, for example according to any one of the preceding items, wherein i is the leaching (mg/cm$^2$) of one or more type(s) of ions and/or compounds obtainable by the method $L_i$ as described herein; and wherein o is the leaching (mg/cm$^2$) of one or more type(s) of ions and/or compounds obtainable by the method $L_o$ as described herein.

28. Method, use and/or coated container, for example according to any one of the preceding items, wherein o is the leaching (mg/cm$^2$) of one or more type(s) of ions and/or compounds leached out of an uncoated container, wherein the uncoated container is obtainable by the same production method as the coated container, wherein o is obtainable by the method according to any one of the preceding items and/or obtainable by a method $L_i$ described herein.

29. Method, use and/or coated container, for example according to any one of the preceding items, wherein the one or more type(s) of ions and/or compounds are alkaline metal ions and/or alkaline earth metal ions, for example Na ions and/or K ions.

30. Method, use and/or coated container, for example according to any one of the preceding items, wherein the one or more type(s) of ions and/or compounds are:

one or more compound(s) comprising C, for example one or more compound(s) comprising C except compounds comprising Si; and/or one or more monomer(s), for example norbornene, norbornane, and/or bicyclopentane; and/or one or more antioxidant(s), for example wherein the antioxidant(s) is/are selected from the group consisting of phenolic antioxidants, pentaerythritol tetrakis(3-(3, 5-di-tert-butyl-4-hydroxyphenyl)propionate and/or dibutylhydroxytoluene (BHT); phosphite antioxidants, tris(2,4-ditert-butylphenyl)phosphite; phosphonite antioxidants, for example tetrakis(2,4-di-tert-butylphenyl)[1,1-biphenyl]-4,4'-diylbisphosphonite; and thioether antioxidants, wherein the antioxidant(s) is/are phenolic antioxidant(s), pentaerythritol tetrakis(3-(3,5-di-tert-butyl-4-hydroxyphenyl)propionate.

31. Method, use and/or coated container, for example according to any one of the preceding items, wherein the coating is a coating obtainable by a coating process, for example a CVD process, a plasma-enhanced chemical vapor deposition (PECVD) process, plasma impulse chemical vapor deposition (PICVD) process or plasma assisted chemical vapor deposition (PACVD) process.

32. Method, use and/or coated container, for example according to any one of the preceding items, wherein the coating is a coating obtainable by a pretreatment and a coating process, for example a CVD process, a plasma-enhanced chemical vapor deposition (PECVD) process, plasma impulse chemical vapor deposition (PICVD) process or plasma assisted chemical vapor deposition (PACVD) process, for example a plasma impulse chemical vapor deposition (PICVD) process, wherein the pretreatment is performed before the coating process.

33. Method, use and/or coated container, for example according to any one of the preceding items, wherein the coating process comprises the following steps:

providing a container, for example a glass container, comprising a surface;

performing a coating process on at least part, for example the inner surface, of the container, comprising:

a) surrounding the at least part of the surface, for example the inner surface, of the container with a precursor P1; and b) irradiating the precursor P1 to generate a plasma; wherein at least one, for example all, of the following parameters is/are fulfilled:

i) wherein the process temperature PT1 is 200° C. to Tg of the glass of the glass element, for example 200° C. to 500° C., 220° C. to 450° C., 240° C. to 320° C., or 250° C. to 300° C.; and/or ii) wherein the pulse duration PD1 of the plasma is 50 µs or less, for example 40 µs or less, for example 30 µs or less, 20 µs or less, 15 µs or less, 12 µs or less, 8 µs or less, 6 µs or less, 4 µs or less, or 3 µs; and/or iii) wherein the pulse duration PD1 of the plasma is 0.1 µs or more, for example 0.5 or more, 1 µs or more, or 6 µs or more; and/or iv) wherein the irradiation is carried out by a microwave generator, for example wherein the ray has a frequency of 300 MHz to 300 GHz, 600 MHz to 100 GHz, 800 MHz to 10 GHz, 900 MHz to 3 GHz, or 2.45 GHz; and/or v) wherein the input power IP1, for example the input power IP1 of the microwave generator, is 1000 W to 10000 W, for example 2100 W to 8000 W, 2500 W to 6700 W, 3000 W to 6000 W, 3200 W to 5500 W, or 4000 W to 5000 W; and/or vi) wherein precursor P1 comprises one or more of hexamethyldisiloxane (HMDSO), hexamethyldisilazane (HMDS), tetramethylsilane (TMS), trimethylborazole (TMB), tri(dimethylaminosilyl)-amino-di(dimethylamino)borane (TDADB), tris(trimethylsilyl)borate (TMSB), hexamethylcyclotrisiloxan (HMCTSO), octamethylcyclotetrasiloxan (OMCTS), decamethylcyclopentasiloxan (DMCPS), dodecamethylcyclohexasiloxan (DMCHS) diacetoxy-di-t-butoxysilane (DADBS), tetraethoxysilane (TEOS), tris(trimethylsilyloxy)vinylsilane (TTMSVS), vinyltriethoxysilane (VTES) and/or combinations thereof, for example the precursor P1 is HMDSO; and/or vii) wherein the precursor P1 comprises, for example consists of, the elements Si, C, O and H; and/or viii) the pulse pause PP1 between two pulses is 1 µs or more, for example 10 µs or more, 1 µs to 5 s, 0.1 ms to 10 ms, 0.2 ms to 2.0 ms, 0.3 ms to 1.2 ms, or 0.4 ms to 0.8 ms; and/or ix) the total time TT1 of irradiation is 0.1 s or more, for example 1 s or more, 1 s to 5 min, 3 s to 90 s, or 5 s to 40 s; and/or x) the ratio [µs/ms] of all pulse durations PD1 [µs] to all pulse pauses PP1 [ms] is 1 or more, for example 2 or more, 2 to 50, or 3 to 8; and/or xi) wherein the process pressure PR1 is 0.01 mbar to 500 mbar, for example 0.1 mbar to 10 mbar, 0.3 mbar to 5 mbar, 0.6 mbar to 2.0 mbar, or 0.8 mbar; and/or xii) wherein the process temperature is decreasing, for example steadily decreasing, during the coating process; and/or xiii) wherein the process temperature PT1 is at least partially, for example at the time when coating process starts, 220° C. or more, for example 240° C. or more, 250° C. or more, 255° C. or more, 270° C. or more, or 280° C. or more; and/or xiv) wherein the flow rate of the precursor P1 is 0.1 to 500 sccm, for example 5 to 100 sccm, 8 to 30 sccm, or 10 to 15 sccm.

34. Method, use and/or coated container, for example according to any one of the preceding items, wherein the pretreatment is a plasma pretreatment comprising the following steps:

providing a container, for example a glass container, comprising a surface;

performing a coating process on at least part, for example the inner surface, of the container, comprising the steps:

a) surrounding the at least part of the surface, for example the inner surface, of the container with a precursor P2; and b) irradiating the precursor P2 to generate a plasma; wherein at least one, for example all, of the following parameters is/are fulfilled:

i) wherein the process temperature PT2 is room temperature to Tg of the glass of the glass element, for example room temperature to 450° C., room temperature to 400° C., room temperature to 320° C., or room temperature to 280° C.; and/or ii) wherein the pulse duration PD2 of the plasma is 50 ms or less, for example 40 ms or less, for example 30 ms or less, 20 ms or less, 15 ms or less, 8 ms or less, 6 ms or less, 1 ms or less, or 0.5 ms; and/or iii) wherein the pulse duration PD2 of the plasma is 0.1 ms or more, for example 0.2 ms or more, 0.3 ms or more, or 0.5 ms or more; and/or iv) wherein the irradiation is carried out by a microwave generator, for example wherein the ray has a frequency of 300 MHz to 300 GHz, 600 MHz to 100 GHz, 800 MHz to 10 GHz, 900 MHz to 3 GHz, or 2.45 GHz; and/or v) wherein the input power IP2, for example the input power IP2 of the microwave generator, is 1000 W to 10000 W, for example 2500 W to 8000 W, 4000 W to 8000 W, 5000 W to 7000 W, 5000 W to 6500 W, or 5250 W to 5750 W; and/or vi) the precursor P2 comprises oxygen and/or nitrogen and/or precursor P2 is air; and/or vii) wherein the precursor P2 comprises, for example consists of, the elements N, e.g. $N_2$, and/or O, e.g. $O_2$; and/or viii) the pulse pause PP2 between two pulses is 1 µs or more, for example 10 µs or more, 1 µs to 5 s, 0.1 ms to 10 ms, 0.5 ms to 2.0 ms, 1.5 ms to 2.0 ms, or 1.8 ms; and/or ix) the total time TT2 of irradiation is 0.1 s or more, for example 1 s or more, 1 s to 5 min, or 5 s to 15 s; and/or x) the ratio [ms/ms] of all pulse durations PD2 [ms] to all pulse pauses PP2 [ms] is 0.05 or more, for example 0.1 or more, 0.15 to 5, or 0.2 to 0.5; and/or xi) wherein the process pressure PR2 is 0.01 mbar to 500 mbar, for example 0.1 mbar to 100 mbar, 0.5 mbar to 10 mbar, 0.8 mbar to 6.0 mbar, or 1.0 mbar to 4.0 mbar; and/or xii) wherein the process temperature PT2 is increasing, for example steadily increasing, during the plasma pretreatment; and/or xiii) wherein the process temperature PT2 is at least partially, for example at the time when the plasma pretreatment process ends, 220° C. or more, for example 240° C. or more, 250° C. or more, 255° C. or more, 270° C. or more, or 280° C. or more; and/or xiv) wherein the flow rate of the precursor P2 is 0.1 to 500 sccm, for example 5 to 100 sccm, 8 to 50 sccm, or 20 to 30 sccm.

35. Method, use and/or coated container, for example according to any one of the preceding items, wherein the inner surface of the container, for example the entire inner surface of the container, is coated.

36. Method, use and/or coated container, for example according to any one of the preceding items, wherein the outer surface of the container is uncoated.

37. Method, use and/or coated container, for example according to any one of the preceding items, wherein the base material of the coated container comprises, for example consists of, glass, for example borosilicate glass or alumino borosilicate glass.

38. Method, use and/or coated container, for example according to any one of the preceding items, wherein the composition of the glass comprises, for example consists of, in mass-%:

$SiO_2$: 30 to 98%, for example 50 to 90% or 70.0 to 74.0%;

$B_2O_3$: 0 to 30%, for example 3 to 20% or 7.0 to 16.0%;

$Al_2O_3$: 0 to 30%, for example 1 to 15% or 3.0 to 6.5%;

$X_2O$: 0 to 30%, for example 1 to 15% or 2.0 to 7.2%, wherein X is selected from Na, K, and/or Li;

YO: 0 to 30%, for example 0.1 to 5% or 0.5 to 1.0%, wherein Y is selected from Ca, Mg, and/or Ba; and unavoidable impurities.

39. Method, use and/or coated container, for example according to any one of the preceding items, wherein the base material of the coated container comprises, for example consists of, a polymer, for example cyclic olefin copolymer COC and/or cyclic olefin polymer COP.

40. Method, use and/or coated container, for example according to any one of the preceding items, wherein the base material of the coated container comprises:

one or more compound(s) comprising C, for example one or more compound(s) comprising C except compounds comprising Si; and/or one or more monomer(s), for example norbornene, norbornane, and/or bicyclopentane; and/or one or more antioxidant(s), for example wherein the antioxidant(s) is/are selected from the group consisting of phenolic antioxidants, pentaerythritol tetrakis(3-(3, 5-di-tert-butyl-4-hydroxyphenyl)propionate and/or dibutylhydroxytoluene (BHT); phosphite antioxidants, tris(2,4-ditert-butylphenyl)phosphite; phosphonite antioxidants, for example tetrakis(2,4-di-tert-butylphenyl)[1,1-biphenyl]-4,4'-diylbisphosphonite; and thioether antioxidants, wherein the antioxidant(s) is/are phenolic antioxidant(s), pentaerythritol tetrakis(3-(3,5-di-tert-butyl-4-hydroxyphenyl)propionate.

41. Method, use and/or coated container, for example according to any one of the preceding items, wherein the brimful volume of the container is 0.1 ml to 1000 ml, for example, 0.5 ml to 500 ml, 1 ml to 250 ml, 2 ml to 30 ml, 3 ml to 15 ml, about 1 ml, 2 ml, 3 ml, 4, ml, 5 ml, 6 ml, 7 ml, 8 ml, 9 ml, 10 ml, 11 ml, 12 ml, 13 ml, 14 ml or 15 ml, or 5 to 15 ml.

42. Method, use and/or coated container, for example according to any one of the preceding items, wherein the coated container is a coated pharmaceutical container, for example a coated vial, coated syringe, coated ampoule or coated cartridge.

43. Method, use and/or coated container, for example according to any one of the preceding items, wherein the coated container is a coated pharmaceutical container, for example a cartridge or syringe, wherein the smaller opening of the cartridge or syringe, for example syringe, is closed, for example by a tip cap and/or stopper.

44. Method, use and/or coated container, for example according to any one of the preceding items, wherein the at least part of the coated surface, the at least part of the alkaline treated surface, and the at least part of the acidic treated surface are the same; and/or wherein the at least part of the coated surface comprises at least part of the inner surface, for example the at least part of the coated surface is the surface which is in contact with a solution when the coated container stands on an even ground and is filled with the solution having a volume of 10% or more, for example 30% or more, 90% or more, or 90%, with respect to the brimful volume [vol./vol.] of the coated container; and/or wherein the at least part of the coated surface is the surface which is in contact with a solution when the coated container is filled to the filling volume according to ISO 4802-2:2016 (E); section 7.2.

45. Method, use and/or coated container, for example according to any one of the preceding items, wherein the base material of the container comprises the one or more type(s) of ions and/or compounds.

46. Kit, comprising:
  i) a coated container, for example according to any one of the preceding items, and
  ii) a data sheet or storage medium comprising the results of the quality evaluation obtainable by the method according to any one of preceding items.

EXAMPLES

In the following, the invention is further described by the following examples:

Example 1

If not stated otherwise, example 1 was prepared according to EP 0 821 079 A1, EP 0 811 367 A2, WO 03 015 122 A1 and EP 2 106 461 A1:

Two 10 R vials (EVERIC™ pure from SCHOTT AG) were provided. As first pretreatment, a washing pretreatment was performed in which the vials were washed with ultra-pure water with ≤10 µS/cm at 25° C. for two minutes at room temperature, for 6 minutes at 40° C., and subsequently for 25 minutes at room temperature in a laboratory dishwasher (LS-2000 from HAMO AG). Afterwards, the vials were dried for 20 minutes at 300° C.

Subsequently, the two vials were treated and coated simultaneously using an apparatus according to WO 03 015 122 A1. For all plasma treatments, a microwave irradiation was used having a frequency of 2.45 GHz. The reaction chambers were the insides of the vials. Ambient conditions prevailed outside of the vials.

First, the inside of the vials were evacuated until a value of 0.05 mbar was reached. Afterwards, oxygen was filled in the vials (flow rate for both vials: 50 sccm) until a pressure of 5 mbar was reached and then a plasma pretreatment started. The plasma was excited with an input power of 6700 W (for both vials) in a pulsed mode with a pulse duration of 0.5 ms, and pulse pause of 1.8 ms. The plasma pretreatment was performed for 14 seconds until the temperature of the vials was 280° C., measured with a pyrometer at the middle of the cylindrical part of the vials.

Immediately afterwards the coating process was performed. The vials were filled with HMDSO (flow rate for both vials: 25 sccm) and the pressure was set to 0.8 mbar. Then, the vials were irradiated for 0.2 s (pressure: 0.8 mbar, flow rate for both vials: 25 sccm HMDSO, input power: 6000 W, pulse duration: 0.050 ms, pulse pause: 30 ms) and subsequently irradiated for 50 s (pressure: 0.8 mbar, flow rate for both vials: 25 sccm HMDSO, input power: 3250 W, pulse duration: 0.003 ms, pulse pause: 1 ms).

Afterwards, a post-processing was performed, i.e. filling the vials with argon and cooling the vials to room temperature in the presence of argon to obtain two equally coated vials.

Example 2

If not stated otherwise, example 2 was prepared according to EP 0 821 079 A1, EP 0 811 367 A2, WO 03 015 122 A1 and EP 2 106 461 A1:

Two 10 R vials (EVERIC™ pure from SCHOTT AG) were provided. As first pretreatment, a washing pretreatment was performed in which the vials were washed with ultra-pure water with ≤10 µS/cm at 25° C. for two minutes at room temperature, for 6 minutes at 40° C., and subsequently for 25 minutes at room temperature in a laboratory dishwasher (LS-2000 from HAMO AG). Afterwards, the vials were dried for 20 minutes at 300° C.

Subsequently, the two vials were treated and coated simultaneously using an apparatus according to WO 03 015 122 A1. For all plasma treatments, a microwave irradiation was used having a frequency of 2.45 GHz. The reaction chambers were the insides of the vials. Ambient conditions prevailed outside of the vials.

First, the inside of the vials were evacuated until a value of 0.05 mbar was reached. Afterwards, oxygen was filled in the vials (flow rate for both vials: 50 sccm) until a pressure of 1.2 mbar was reached and then a plasma pretreatment started. The plasma was excited with an input power of 5500 W in a pulsed mode with a pulse duration of 0.5 ms, and pulse pause of 1.8 ms. The plasma pretreatment was performed for 27 seconds until the temperature of the vials was 280° C., measured with a pyrometer at the middle of the cylindrical part of the vials.

Immediately afterwards (11 seconds) the coating process was performed. The vials were filled with HMDSO (flow rate for both vials: 25 sccm) and the pressure was set to 0.8 mbar. Then, the vials were irradiated for 0.2 s (pressure: 0.8 mbar, flow rate for both vials: 25 sccm HMDSO, input power: 6000 W, pulse duration: 0.050 ms, pulse pause: 30 ms) and subsequently irradiated for 11 s (pressure: 0.8 mbar, flow rate for both vials: 25 sccm HMDSO, input power: 4500 W, pulse duration: 0.008 ms, pulse pause: 0.5 ms). After the coating process, the temperature of the vials was 280° C., measured with a pyrometer at the middle of the cylindrical part of the vials.

Afterwards, a post-processing was performed, i.e. filling the vials with oxygen and cooling the vials to room temperature in the presence of oxygen to obtain two equally coated vials.

Examples 3 and 4

Example 3 is a SCHOTT Top Lyo® 10R vial and Example 4 is an uncoated SCHOTT Everic™ pure 10 R vial.

The values for Examples 1 to 4 obtainable by the method $L_i$ described herein are depicted in Table 1.

TABLE 1

Leaching values for examples 1 to 4

| Example # | i [mg/l] Na ions | i [mg/cm²] Na ions | o* [mg/cm²] Na ions | i/o [mg/cm²]/[mg/cm²] Na ions/Na ions |
|---|---|---|---|---|
| 1 | 0.2 | $9.9*10^{-5}$ | $7.0*10^{-4}$ | 0.14 |
| 2 | 0.1 | $4.7*10^{-5}$ | $7.0*10^{-4}$ | 0.07 |
| 3 | 1.4 | $6.6*10^{-4}$ | $7.0*10^{-4}$ | 0.95 |
| 4 | 1.5 | $7.0*10^{-4}$ | $7.0*10^{-4}$ | 1.00 |

*o is measured by method $L_i$ of the uncoated container

In the following description of embodiments, with reference to the drawings, the same reference numeral designates similar components.

REFERENCE LIST

1 glass surface
2 coating
3 pretreated glass surface
4 outer surface of the container
5 inner surface of the container
6 upper surface of the crown of the container
1001 providing a coated container;
1002 performing an alkaline treatment on at least part of the coated surface of the coated container to obtain an alkaline treated surface;
1003 performing an acidic treatment on at least part of the alkaline treated surface to obtain an acidic treated surface and a treated acidic solution; and
1004 quantifying the leaching of one or more type(s) of ions and/or compounds of the at least part of the acidic treated surface to obtain results of the quality evaluation.

Figure 2:
FIG. 2 is a schematic side view of an at least partly pretreated and at least partly coated surface.
Figure 3:
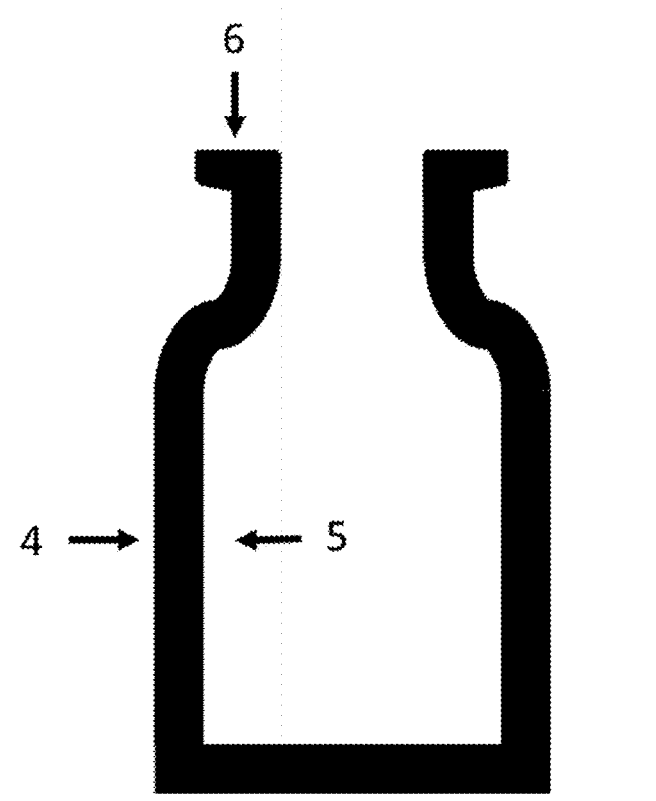
FIG. 3: is a schematic side view of an embodiment provided according to the invention.

Referring now to the drawings, FIGS. 1 and 2 depict schematic side views of an embodiment provided according to the invention. In FIG. 1, the glass surface 1 is partly coated by the coating 2. The depicted coating is a single layer coating. Consequently, the coating is in direct contact with the glass surface 1 and is the outermost layer. In FIG. 2, the partly pretreated glass surface 3 is partly coated by the coating 2. The depicted coating is a single layer coating. Consequently, the coating is in direct contact with the glass surface 1 and is the outermost layer. FIG. 3 shows a schematic side view of an embodiment provided according to the invention. The outer surface of the container 4 is uncoated and the inner surface of the container 5 is coated. The upper surface of the crown of the container does neither belong to the outer surface of the container 4 nor to the inner surface of the container 5 and is for example uncoated.

Figure 4:
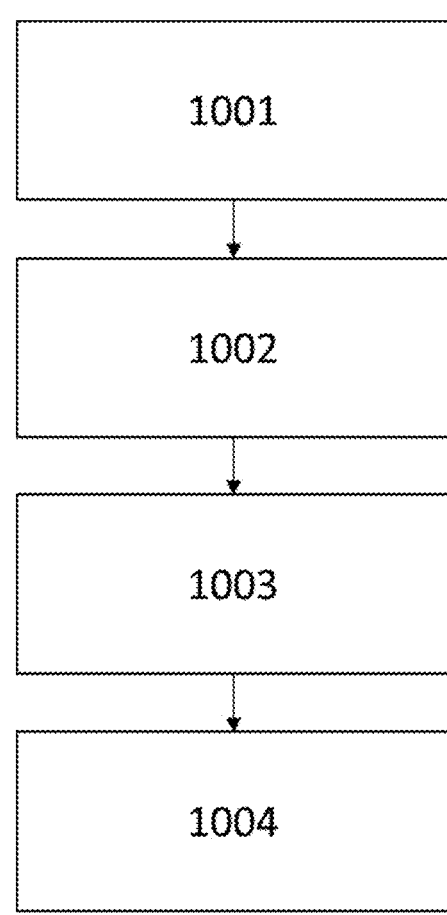
FIG. 4: is a block diagram of a method provided according to the invention.

FIG. 4 shows a block diagram of a method provided according to the invention. First, a coated container is provided which may be heat treated or not heat treated 1001. Afterwards an alkaline treatment on at least part of the coated surface of the coated container to obtain an alkaline treated surface is performed 1002. Thereafter, an acidic treatment on at least part of the alkaline treated surface to obtain an acidic treated surface and a treated acidic solution is performed 1003. Finally the leaching of one or more type(s) of ions and/or compounds of the at least part of the acidic treated surface to obtain results of the quality evaluation is quantified 1004.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A coated container, comprising:
a container comprising a surface and defining a brimful volume; and
a coating applied to at least part of the surface to form a coated surface, wherein leaching of at least one of one or more types of ions or one or more types of compounds is determined by performing an alkaline treatment on at least part of the coated surface to obtain an alkaline treated surface and performing an acidic treatment on at least part of the alkaline treated surface to obtain an acidic treated surface, wherein the leaching of the at least one of one or more types of ions or one or more types of compounds from the coated surface is 5.00 mg/l or less;
wherein the alkaline treatment comprises: bringing an alkaline solution comprising water and a base at a concentration of 0.0001 mol/l to 1 mol/l and exhibiting a pH of 7< to 14 in contact with the at least part of the coated surface of the container for 1 second to 1 week, wherein a temperature outside the container is set to 20° C. to 200° C. and the alkaline solution fills 10% to 100% of the brimful volume of the container; and
wherein the acidic treatment comprises: bringing an acidic solution comprising water and an acid at a concentration of 0.0001 mol/l to 1 mol/l and exhibiting a pH <7 in contact with the at least part of the alkaline treated surface for 1 second to 1 week, wherein a temperature outside the container is set to 20° C. to 200° C. and the acidic solution fills 10% to 100% of the brimful volume of the container; wherein the one or more types of ions or one or more types of compounds is selected from the group consisting of alkaline metal ions, alkaline earth metal ions, one or more compounds comprising C, one or more monomers, one or more antioxidants, and combinations thereof.

2. The coated container of claim 1, wherein the leaching of the at least one of one or more types of ions or one or more types of compounds is a, wherein a≤1.00*b;
wherein if 0.9× the brimful volume of the container is ≤1 ml, b is 5.00 mg/l;
wherein if 0.9× the brimful volume of the container is >1 ml and ≤2 ml, b is 4.50 mg/l;
wherein if 0.9× the brimful volume of the container is >2 ml and ≤3 ml, b is 4.10 mg/l;
wherein if 0.9× the brimful volume of the container is >3 ml and ≤5 ml, b is 3.20 mg/l;
wherein if 0.9× the brimful volume of the container is >5 ml and ≤10 ml, b is 2.50 mg/l;

wherein if 0.9× the brimful volume of the container is >10 ml and ≤20 ml, b is 2.00 mg/l;

wherein if 0.9× the brimful volume of the container is >20 ml and ≤50 ml, b is 1.50 mg/l;

wherein if 0.9× the brimful volume of the container is >50 ml and ≤100 ml, b is 1.20 mg/l;

wherein if 0.9× the brimful volume of the container is >100 ml and ≤200 ml, b is 1.00 mg/l;

wherein if 0.9× the brimful volume of the container is >200 ml and ≤500 ml, b is 0.75 mg/l; and wherein if 0.9× the brimful volume of the container is >500 ml, b is 0.50 mg/l.

3. The coated container of claim 2, wherein a≤0.70*b.

4. The coated container of claim 3, wherein a≤0.40*b.

5. The coated container of claim 4, wherein a≤0.10*b.

6. The coated container of claim 1, wherein the container comprises a base material, an inner surface, and an outer surface, wherein at least a part of the inner surface is the coated surface; and wherein the coated container exhibits in the following equation i/o ≤0.90 in $[mg/cm^2]/[mg/cm^2]$, wherein i is the the leaching of the at least one of one or more types of ions or one or more types of compounds from the coated surface; and wherein o is leaching of the at least one of one or more types of ions or one or more types of compounds of the base material.

7. The coated container of claim 6, wherein i/o≤0.60.

8. The coated container of claim 7, wherein i/o≤0.30.

9. The coated container of claim 8, wherein i/o≤0.20.

10. The coated container of claim 6, wherein at least one of the following is satisfied:

i is $1.0*10^{-10}$ $mg/cm^2$ to $1.0*10^{-3}$ $mg/cm^2$; or o is $1.1*10^{-5}$ $mg/cm^2$ to $1.0*10^{-1}$ $mg/cm^2$.

11. The coated container of claim 1, wherein the container comprises a base material comprising a glass.

12. The coated container of claim 11, wherein the glass has a composition comprising in mass-%:

$SiO_2$: 30 to 98 mass-%;

$B_2O_3$: 0 to 30 mass-%;

$Al_2O_3$: 0 to 30 mass-%;

$X_2O$: 0 to 30 mass-%, wherein X is at least one of Na, K, or Li;

YO: 0 to 30 mass-%, wherein Y is at least one of Ca, Mg, or Ba; and unavoidable impurities.

13. The coated container of claim 11, wherein the glass comprises sodium.

14. The coated container of claim 1, wherein the container comprises a base material comprising a polymer.

15. The coated container of claim 14, wherein the polymer comprises at least one of cyclic olefin copolymer or cyclic olefin polymer.

16. The coated container of claim 1, wherein the container comprises a base material comprising at least one of:

at least one compound comprising C;

at least one monomer; or at least one antioxidant.

17. The coated container of claim 16, wherein the base material comprises at least one monomer, the at least one monomer comprising at least one of norbornene, norbornane, or bicyclopentane.

18. The coated container of claim 16, wherein the base material comprises at least one antioxidant, the at least one antioxidant comprising at least one of:

a phenolic antioxidant;

pentaerythritol tetrakis(3-(3,5-di-tert-butyl-4-hydroxy-phenyl)propionate;

dibutylhydroxytoluene (BHT);

a phosphite antioxidant;

tris(2,4-ditert-butylphenyl)phosphite;

a phosphonite antioxidant;

tetrakis(2,4-di-tert-butylphenyl)[1,1-biphenyl]-4,4'-diyl-bisphosphonite; or a thioether antioxidant.

19. A coated container, comprising a base material, an inner surface, and an outer surface, wherein at least a part of the inner surface is a coated surface; and wherein the coated container exhibits in the following equation i/o≤d, a value d in $[mg/cm_2]/[mg/cm^2]$ of 0.90, wherein i is leaching of at least one of one or more types of ions or one or more types of compounds from the coated surface and wherein o is leaching of at least one of one or more types of ions or one or more types of compounds of the base material, wherein the one or more types of ions or one or more types of compounds is selected from the group consisting of alkaline metal ions, alkaline earth metal ions, one or more compounds comprising C, one or more monomers, one or more antioxidants, and combinations thereof.

* * * * *